US012712119B2

(12) United States Patent
Yoshioka et al.

(10) Patent No.: US 12,712,119 B2
(45) Date of Patent: Aug. 18, 2026

(54) INDUCTOR COMPONENT

(71) Applicant: Murata Manufacturing Co., Ltd., Kyoto-fu (JP)

(72) Inventors: Yoshimasa Yoshioka, Nagaokakyo (JP); Ryouta Sakurai, Nagaokakyo (JP); Katsufumi Sasaki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 885 days.

(21) Appl. No.: 18/046,384

(22) Filed: Oct. 13, 2022

(65) Prior Publication Data

US 2023/0129879 A1 Apr. 27, 2023

(30) Foreign Application Priority Data

Oct. 21, 2021 (JP) ............................. JP2021-172604

(51) Int. Cl.

| | |
|---|---|
| ***H01F 27/29*** | (2006.01) |
| ***H01F 1/20*** | (2006.01) |
| ***H01F 1/34*** | (2006.01) |
| ***H01F 27/28*** | (2006.01) |
| ***H01F 41/12*** | (2006.01) |

(52) U.S. Cl.

CPC ............. *H01F 27/292* (2013.01); *H01F 1/20* (2013.01); *H01F 1/342* (2013.01); *H01F 27/2823* (2013.01); *H01F 41/12* (2013.01)

(58) Field of Classification Search

CPC ........... H02J 50/70; H02J 50/10; H01F 27/33; H01F 27/36; H01F 38/14; H01F 27/363

USPC ................ 336/65, 83, 90, 96, 200, 233–234

See application file for complete search history.

(56) References Cited

U.S. PATENT DOCUMENTS

2015/0102888 A1* 4/2015 Kim .................... H01F 17/0013 336/200
2019/0244743 A1* 8/2019 Hirai ....................... H01F 41/12
2019/0287712 A1* 9/2019 Ishida ..................... H01F 1/143

FOREIGN PATENT DOCUMENTS

JP 2020-145399 A 9/2020

* cited by examiner

*Primary Examiner* — Tuyen T Nguyen

(74) *Attorney, Agent, or Firm* — Studebaker Brackett PLLC

(57) ABSTRACT

An inductor component includes an element body that includes magnetic powder and has first and second principal surfaces, and a side surface connecting the principal surfaces; an inductor wire in the element body; a first vertical wire that is in the element body, is connected to a first end of the inductor wire, and extends to the first principal surface; a second vertical wire that is in the element body, is connected to a second end of the inductor wire, and extends to the first principal surface; a first external terminal that is connected to the first vertical wire and is exposed on the first principal surface; and a second external terminal that is connected to the second vertical wire and is exposed on the first principal surface. The magnetic powder contains an Fe element as a main component, and the side surface has oxidized and non-oxidized regions.

17 Claims, 19 Drawing Sheets

INDUCTOR COMPONENT

CROSS-REFERENCE TO RELATED APPLICATION

This application claims benefit of priority to Japanese Patent Application No. 2021-172604 filed Oct. 21, 2021, the entire content of which is incorporated herein by reference.

BACKGROUND

Technical Field

The present disclosure relates to an inductor component.

Background Art

Conventionally, as an inductor component, there is an inductor component described in Japanese Patent Application Laid-Open No. 2020-145399. The inductor component includes an element body containing metal magnetic powder, first and second coil portions disposed inside the element body, a first external electrode electrically connected to one end of the first coil portion, and a second external electrode electrically connected to one end of the second coil portion. Further, the inductor component includes an insulating layer formed by oxidizing the metal magnetic powder on an entire surface of the element body, and the insulating layer prevents a short circuit between the inductor component and other electronic components.

Incidentally, it has been found that the conventional inductor component has the following problems.

Since the oxidized metal magnetic powder expands, the close contact between the element body and the metal magnetic powder becomes weak, and there is a problem that the strength of the element body decreases. In addition, there is a problem that the oxidized metal magnetic powder falls off from the element body, and the amount of metal magnetic powder decreases, thereby decreasing an inductance.

SUMMARY

Therefore, the present disclosure provides an inductor component capable of suppressing a decrease in element body strength and a decrease in inductance while suppressing a short circuit with other electronic components.

An inductor component according to an aspect of the present disclosure includes an element body that includes magnetic powder and has a first principal surface, a second principal surface, and a side surface connecting the first principal surface and the second principal surface; and an inductor wire that is provided in the element body. The inductor component further includes a first vertical wire that is provided in the element body, is connected to a first end of the inductor wire, and extends to the first principal surface; a second vertical wire that is provided in the element body, is connected to a second end of the inductor wire, and extends to the first principal surface; a first external terminal that is connected to the first vertical wire and is exposed on the first principal surface; and a second external terminal that is connected to the second vertical wire and is exposed on the first principal surface. The magnetic powder contains an Fe element as a main component, and the side surface has an oxidized region in which an oxide film formed by oxidizing a plurality of magnetic powders is exposed, and a non-oxidized region in which the plurality of magnetic powders are exposed.

Here, the oxidized region refers to a region in which the Fe element is 65 wt % or more and an O element is 24 wt % or more, and the non-oxidized region refers to a region in which the Fe element is 65 wt % or more and the O element is less than 24 wt %.

When a mounting density of the components is increased, the distance between the components is shortened, and the external terminal and the side surface of the element body may be in contact with each other in the adjacent components. In this case, a short circuit may occur through the magnetic powder. According to the above aspect, it is possible to suppress the short circuit by increasing an electric resistance of the magnetic powder by the oxidized region provided on the side surface of the element body. In addition, it is possible to suppress a decrease in element body strength and a decrease in inductance by the non-oxidized region provided on the side surface of the element body.

Preferably, in an embodiment of the inductor component, the element body includes a resin containing the magnetic powder, and the magnetic powder in the oxidized region includes magnetic powder in contact with the resin with the oxide film interposed therebetween.

According to the above embodiment, since the magnetic powder in the oxidized region is in contact with the resin with the oxide film interposed therebetween, it is possible to more effectively suppress the short circuit.

Preferably, in an embodiment of the inductor component, the element body includes a resin containing the magnetic powder, and the magnetic powder in the oxidized region includes magnetic powder that is in direct contact with the resin.

According to the above embodiment, since the magnetic powder in the oxidized region is in direct contact with the resin, the close contact between the magnetic powder and the resin is improved, and it is possible to more effectively suppress a decrease in the element body strength and a decrease in the inductance.

Preferably, in an embodiment of the inductor component, the oxidized region has a larger ratio of a reflectance of a wavelength of 600 nm or more and 800 nm or less (i.e., from 600 nm to 800 nm) to a reflectance of a wavelength of less than 600 nm than the non-oxidized region.

According to the embodiment, the oxidized region has larger red reflection than the non-oxidized region. Therefore, since the oxidized region looks red (warm color), it can be easily grasped that the oxidized region is formed, and it can be confirmed from the appearance that the oxidized region has short-circuit resistance.

Preferably, in an embodiment of the inductor component, the oxide film is formed on a cut section of the magnetic powder.

According to the above embodiment, in a case where the element body is ground to reduce the thickness of the element body, the magnetic powder is cut to expose the cut section of the magnetic powder. However, since an oxide film is formed on the cut section of the magnetic powder, short-circuit resistance can be improved.

Preferably, in an embodiment of the inductor component, a thickness of the oxide film is smaller than D50 of a grain diameter of the magnetic powder.

According to the above embodiment, the excessive progress of oxidation causes problems such as a decrease in the strength of the element body and shedding of the magnetic powder, but since the oxide film is thinner than one grain of magnetic powder, such problems can be avoided.

Preferably, in an embodiment of the inductor component, the inductor wire has a first extended portion that is connected to the first end and is exposed from the side surface.

According to the above embodiment, by providing the first extended portion, it is possible to secure the strength at the time of cutting the element body when the inductor component is cut with a dicing machine, and it is possible to improve a yield at the time of manufacturing.

Since the side surface from which the first extended portion is exposed has the oxidized region, the insulation resistance between adjacent first extended portions on the side surface can be increased when a plurality of inductor wires are provided. In addition, when a plurality of inductor components are disposed, the insulation resistance between the first extended portions of the adjacent inductor components can be increased.

Preferably, in an embodiment of the inductor component, the inductor wire includes a plurality of inductor wires, and the plurality of inductor wires are disposed on the same plane parallel to the first principal surface and electrically separated from each other.

According to the above embodiment, an inductor array can be configured, and the inductance density can be increased.

Preferably, in an embodiment of the inductor component, the inductor wire includes a plurality of inductor wires, and the plurality of inductor wires are disposed along a direction orthogonal to the first principal surface.

According to the above embodiment, the inductance density can be increased.

Preferably, in an embodiment of the inductor component, the inductor component further includes an insulating layer that is provided on the first principal surface.

According to the above embodiment, it is possible to suppress the short circuit between the first external terminal and the second external terminal.

Preferably, in an embodiment of the inductor component, the first principal surface has the oxidized region and the non-oxidized region.

According to the above embodiment, it is possible to suppress a decrease in the element body strength and a decrease in the inductance by the non-oxidized region while suppressing the short circuit between the first external terminal and the second external terminal through the magnetic powder on the first principal surface by the oxidized region.

Preferably, in an embodiment of the inductor component, the side surface has a first region in a predetermined range from the first principal surface in a direction orthogonal to the first principal surface, and a second region other than the first region, D50 of the grain diameter of the magnetic powder in the second region is larger than D50 of the grain diameter of the magnetic powder in the first region, and on the side surface, the first region has a larger area of the non-oxidized region than the second region, and the second region has a larger area of the oxidized region than the first region.

Here, the “predetermined range” is set in a range shorter than the wire length of the first vertical wire. The “D50 of the grain diameter of the magnetic powder in the first region” and the “D50 of the grain diameter of the magnetic powder in the second region” can be measured by observing the side surface.

According to the above embodiment, since the magnetic powder having a relatively large grain diameter is disposed around the inductor wire, the inductance can be secured. In addition, the magnetic powder having a relatively small grain diameter is disposed in the first region including the first principal surface and located within a predetermined range from the first principal surface. In the magnetic powder having a relatively small grain diameter, a contact area between grains is small. Therefore, the short circuit through the magnetic powder in the first region can be suppressed. In addition, on the side surface, since the second region has a larger area of the oxidized region than the first region, the short circuit through the magnetic powder in the second region can be suppressed.

Preferably, in an embodiment of the inductor component, the element body has a plurality of magnetic layers stacked in a direction orthogonal to the first principal surface, and the magnetic layer in contact with the inductor wire is disposed along a part of an outer shape of the inductor wire.

According to the above embodiment, the magnetic layer can be disposed along the periphery of the inductor wire, and the inductance can be secured.

Preferably, in an embodiment of the inductor component, D50 of the grain diameter of the magnetic powder in the oxidized region is larger than D50 of the magnetic powder in the non-oxidized region.

According to the above embodiment, the magnetic powder having a large grain diameter is easily oxidized, and the oxidized region can be easily formed.

Preferably, in an embodiment of the inductor component, an amount of Fe element in the oxidized region is larger than an amount of Fe element in the non-oxidized region.

According to the above embodiment, since the amount of Fe element in the oxidized region is large, a large amount of Fe element can be disposed around the inductor wire, and the inductance can be secured.

Preferably, in an embodiment of the inductor component, the side surface further has a recess.

According to the above embodiment, since a surface area of the side surface increases, the heat dissipation can be improved.

Therefore, an inductor component according to another aspect of the present disclosure includes an element body that includes magnetic powder and has a first principal surface, a second principal surface, and a side surface connecting the first principal surface and the second principal surface; and an inductor wire that is provided in the element body. The inductor component further includes a first vertical wire that is provided in the element body, is connected to a first end of the inductor wire, and extends to the first principal surface; a second vertical wire that is provided in the element body, is connected to a second end of the inductor wire, and extends to the first principal surface; a first external terminal that is connected to the first vertical wire and is exposed on the first principal surface; and a second external terminal that is connected to the second vertical wire and is exposed on the first principal surface. The magnetic powder contains an Fe element as a main component, and the side surface has an oxidized region in which the Fe element is 65 wt % or more and the O element is 24 wt % or more on a plurality of magnetic powders, and a non-oxidized region in which the plurality of magnetic powders are exposed.

When a mounting density of the components is increased, the distance between the components is shortened, and the external terminal and the side surface of the element body may be in contact with each other in the adjacent components. In this case, a short circuit may occur through the magnetic powder. According to the above embodiment, it is possible to suppress the short circuit by increasing an electric resistance of the magnetic powder by the oxidized region provided on the side surface of the element body. In addition, it is possible to suppress a decrease in element body strength and a decrease in inductance by the non-oxidized region provided on the side surface of the element body.

According to an inductor component according to one aspect of the present disclosure, it is possible to suppress a decrease in element body strength and a decrease in inductance while suppressing a short circuit with other electronic components.

DETAILED DESCRIPTION

Hereinafter, an inductor component which is one aspect of the present disclosure will be described in detail with reference to illustrated embodiments. Note that the drawings include some schematic drawings, and may not reflect actual dimensions or ratios.

First Embodiment (Configuration)

Figure 1:
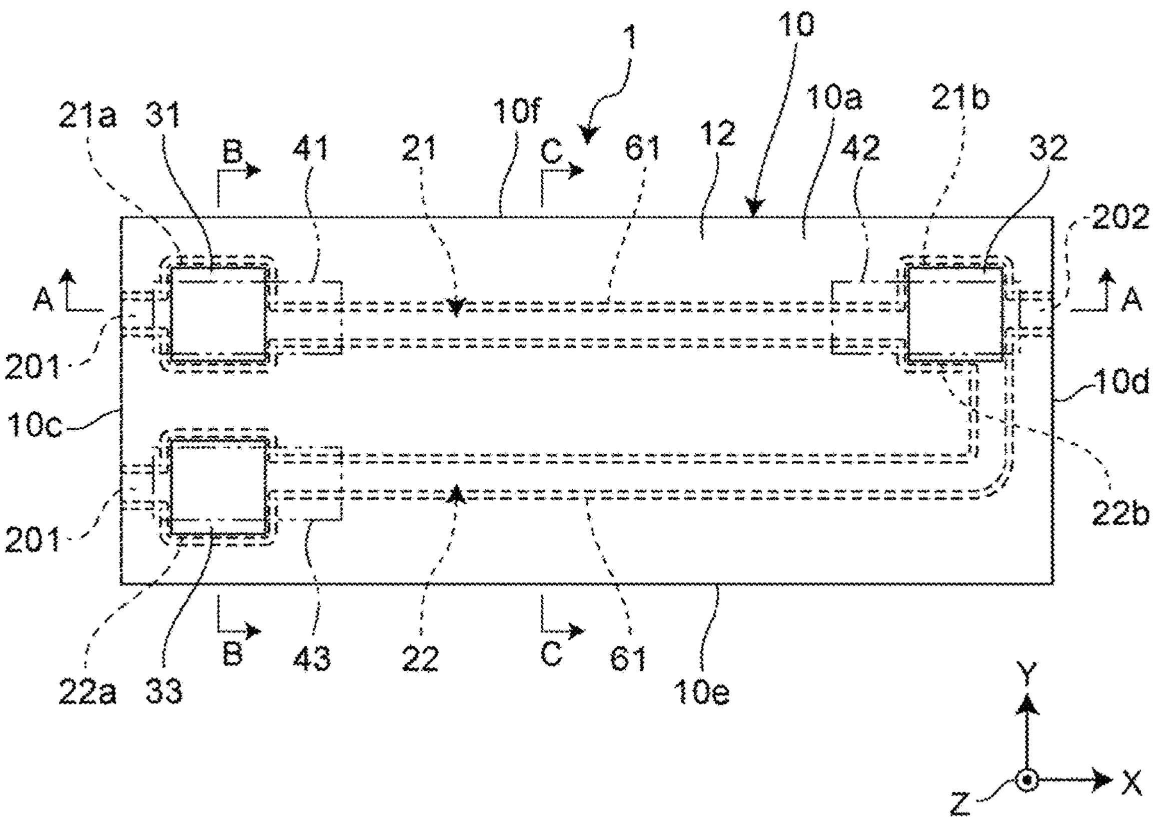
FIG. 1 is a plan view illustrating a first embodiment of an inductor component.
Figure 2A:
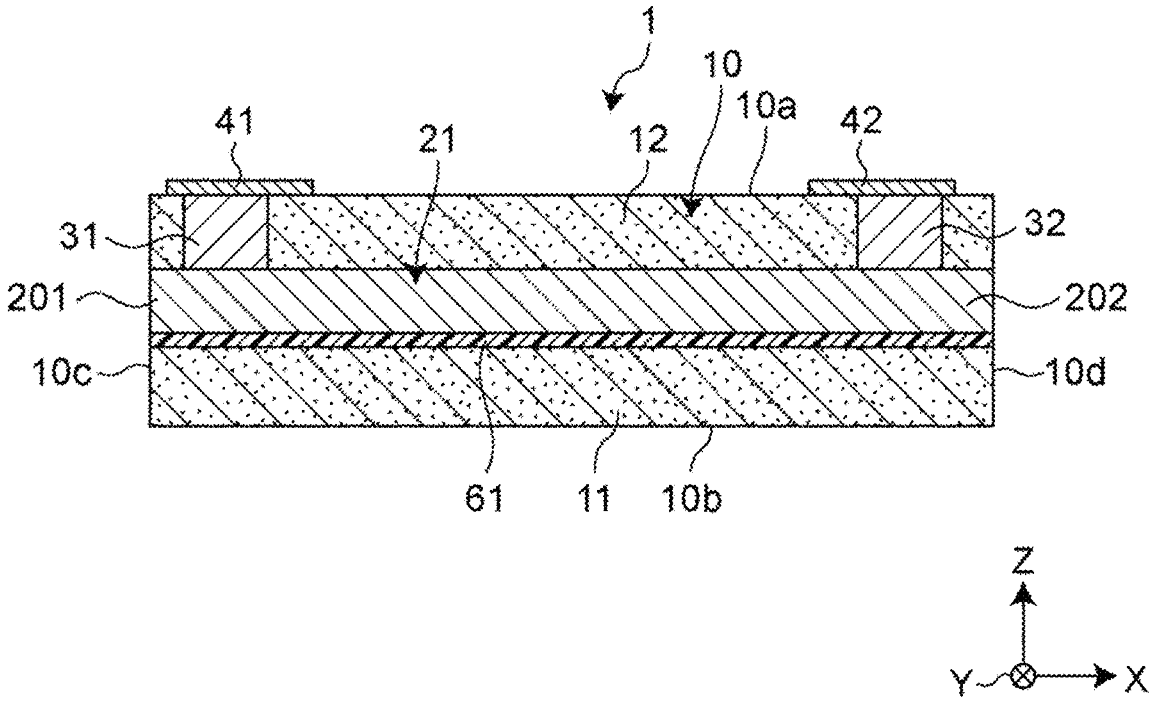
FIG. 2A is a sectional view taken along the line A-A of FIG. 1.
Figure 2B:
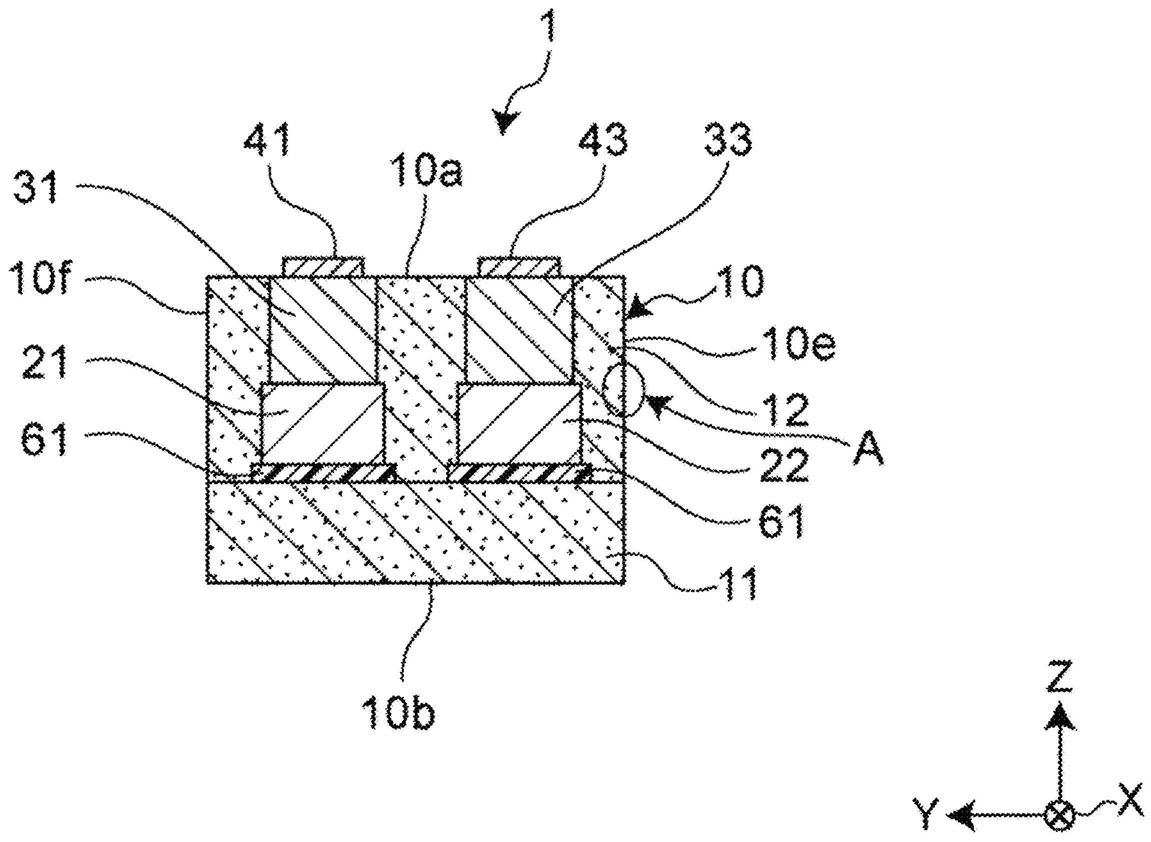
FIG. 2B is a sectional view taken along the line B-B of FIG. 1.

FIG. 1 is a plan view illustrating a first embodiment of an inductor component. FIG. 2A is a sectional view taken along the line A-A of FIG. 1. FIG. 2B is a sectional view taken along the line B-B in FIG. 1.

An inductor component 1 is mounted on an electronic device such as a personal computer, a DVD player, a digital camera, a TV, a mobile phone, or car electronics, and is, for example, a component having a rectangular parallelepiped shape as a whole. However, the shape of the inductor component 1 is not particularly limited, and may be a columnar shape, a polygonal columnar shape, a truncated cone shape, or a polygonal frustum shape.

As illustrated in FIGS. 1, 2A, and 2B, the inductor component 1 includes an element body 10, a first inductor wire 21 and a second inductor wire 22 provided in the element body 10, a first columnar wire 31, a second columnar wire 32, and a third columnar wire 33 provided in the element body 10 such that an end face is exposed from a first principal surface 10*a* of the element body 10, and a first external terminal 41, a second external terminal 42, and a third external terminal 43 exposed on the first principal surface 10*a* of the element body 10. In FIG. 1, for convenience, the first to third external terminals 41 to 43 are indicated by two-dot chain lines.

In the drawings, a thickness direction of the inductor component 1 is defined as a Z direction, a forward Z direction is defined as an upper side, and a reverse Z direction is defined as a lower side. In a plane orthogonal to the Z direction of the inductor component 1, a length direction of the inductor component 1 is defined as an X direction, and a width direction of the inductor component 1 is defined as a Y direction.

The element body 10 has a first principal surface 10*a* and a second principal surface 10*b*, and a first side surface 10*c*, a second side surface 10*d*, a third side surface 10*e*, and a fourth side surface 10*f* that are located between the first principal surface 10*a* and the second principal surface 10*b* and connect the first principal surface 10*a* and the second principal surface 10*b*.

The first principal surface 10*a* and the second principal surface 10*b* are disposed opposite to each other in the Z direction, the first principal surface 10*a* is disposed in the forward Z direction, and the second principal surface 10*b* is disposed in the reverse Z direction. The first side surface 10*c* and the second side surface 10*d* are disposed opposite to each other in the X direction, the first side surface 10*c* is disposed in the reverse X direction, and the second side surface 10*d* is disposed in the forward X direction. The third side surface 10*e* and the fourth side surface 10*f* are disposed opposite to each other in the Y direction, the third side surface 10*e* is disposed in the reverse Y direction, and the fourth side surface 10*f* is disposed in the forward Y direction.

The element body 10 has a first magnetic layer 11 and a second magnetic layer 12 sequentially stacked along the forward Z direction. Each of the first magnetic layer 11 and the second magnetic layer 12 contains magnetic powder and a resin containing the magnetic powder. The resin is, for example, an organic insulating material including an epoxy-based resin, a phenol-based resin, a liquid crystal polymer-based resin, a polyimide-based resin, an acrylic resin, or a mixture containing them. The magnetic powder is, for example, an FeSi-based alloy such as FeSiCr, an FeCo-based alloy, an Fe-based alloy such as NiFe, or an amorphous alloy thereof. Therefore, as compared with a magnetic layer made of ferrite, DC superposition characteristics can be improved by the magnetic powder, and magnetic powders are insulated from each other by the resin, so that a loss (iron loss) at a high frequency is reduced.

The first inductor wire 21 and the second inductor wire 22 are disposed on a plane orthogonal to the Z direction between the first magnetic layer 11 and the second magnetic layer 12. Specifically, the first magnetic layer 11 exists in the reverse Z direction of the first inductor wire 21 and the second inductor wire 22, and the second magnetic layer 12 exists in the direction orthogonal to the forward Z direction and the forward Z direction of the first inductor wire 21 and the second inductor wire 22.

The first inductor wire 21 extends linearly along the X direction when viewed from the Z direction. When the second inductor wire 22 is viewed from the Z direction, a part of the second inductor wire 22 extends linearly along the X direction, and the other part extends linearly along the Y direction, that is, the second inductor wire 22 extends in an L shape.

The thicknesses of the first and second inductor wires 21 and 22 are preferably, for example, 40 μm or more and 120 μm or less (i.e., from 40 μm to 120 μm). As examples of the first and second inductor wires 21 and 22, the thickness is 35 μm, the wire width is 50 μm, and the maximum space between the wires is 200 μm.

The first inductor wire 21 and the second inductor wire 22 are made of a conductive material, for example, a low electric resistance metal material such as Cu, Ag, Au, or Al. In the present embodiment, the inductor component 1 includes only one layer of the first and second inductor wires 21 and 22, and the height of the inductor component 1 can be reduced. Note that the inductor wire may have a two-layer structure of a seed layer and an electrolytic plating layer, or may contain Ti or Ni as the seed layer.

A first end 21*a* of the first inductor wire 21 is electrically connected to the first columnar wire 31, and a second end 21*b* of the first inductor wire 21 is electrically connected to the second columnar wire 32. That is, the first inductor wire 21 has a pad portion having a large line width at the first and second ends 21*a* and 21*b*, and is directly connected to the first and second columnar wires 31 and 32 at the pad portions.

A first end 22*a* of the second inductor wire 22 is electrically connected to the third columnar wire 33, and a second end 22*b* of the second inductor wire 22 is electrically connected to the second columnar wire 32. That is, the second inductor wire 22 has a pad portion at the first end 22*a*, and is directly connected to the third columnar wire 33 at the pad portion. The second end 22*b* of the second inductor wire 22 is common to the second end 21*b* of the first inductor wire 21.

The first end 21*a* of the first inductor wire 21 and the first end 22*a* of the second inductor wire 22 are located on the side of the first side surface 10*c* of the element body 10 when viewed from the Z direction. The second end 21*b* of the first inductor wire 21 and the second end 22*b* of the second inductor wire 22 are located on the side of the second side surface 10*d* of the element body 10 when viewed from the Z direction.

A first extended wire 201 is connected to each of the first end 21*a* of the first inductor wire 21 and the first end 22*a* of the second inductor wire 22, and the first extended wire 201 is exposed from the first side surface 10*c*. A second extended wire 202 is connected to the second end 21*b* of the first inductor wire 21 and the second end 22*b* of the second inductor wire 22, and the second extended wire 202 is exposed from the second side surface 10*d*.

The first extended wire 201 and the second extended wire 202 are wires to be connected to a power supply wire when electrolytic plating is additionally performed after the shapes of the first and second inductor wires 21 and 22 are formed in the manufacturing process of the inductor component 1. In an inductor substrate state before the inductor component 1 is cut with the dicing machine by the power supply wire, electrolytic plating can be additionally easily performed, and the distance between the wires can be decreased. Further, by additionally performing electrolytic plating and decreasing the distance between the wires of the first and second inductor wires 21 and 22, magnetic coupling between the first and second inductor wires 21 and 22 can be enhanced. In addition, by providing the first extended wire 201 and the second extended wire 202, the strength can be secured at the time of cutting the element body 10 when the inductor component 1 is cut with the dicing machine, and the yield at the time of manufacturing can be improved.

The first to third columnar wires 31 to 33 extend in the Z direction from the inductor wires 21 and 22 and penetrate the inside of the second magnetic layer 12. The columnar wire corresponds to a "vertical wire".

The first columnar wire 31 extends from a top surface of the first end 21*a* of the first inductor wire 21 to the first principal surface 10*a* of the element body 10, and the end face of the first columnar wire 31 is exposed from the first principal surface 10*a* of the element body 10. The second columnar wire 32 extends from a top surface of the second end 21*b* of the first inductor wire 21 to the first principal surface 10*a* of the element body 10, and the end face of the second columnar wire 32 is exposed from the first principal surface 10*a* of the element body 10. The third columnar wire 33 extends from a top surface of the first end 22*a* of the second inductor wire 22 to the first principal surface 10*a* of the element body 10, and the end face of the third columnar wire 33 is exposed from the first principal surface 10*a* of the element body 10.

Therefore, the first columnar wire 31, the second columnar wire 32, and the third columnar wire 33 linearly extend in a direction orthogonal to the first principal surface 10*a* from the first inductor wire 21 and the second inductor wire 22 to the end face exposed from the first principal surface 10*a*. As a result, the first external terminal 41, the second external terminal 42, and the third external terminal 43 can be connected to the first inductor wire 21 and the second inductor wire 22 at a shorter distance, and a decrease in resistance or an increase in inductance of the inductor component 1 can be realized. The first to third columnar wires 31 to 33 are made of a conductive material, for example, the same material as the inductor wires 21 and 22.

Note that, when the first and second inductor wires 21 and 22 are covered with an insulating layer made of a non-magnetic material, the first to third columnar wires 31 to 33 may be electrically connected to the first and second inductor wires 21 and 22 with a via wire penetrating the insulating layer interposed therebetween. The via wire is a conductor having a line width (a diameter and a sectional area) smaller than that of the columnar wire. In this case, the "vertical wire" includes the via wire and the columnar wire.

The first to third external terminals 41 to 43 are provided on the first principal surface 10*a* of the element body 10. The first to third external terminals 41 to 43 are made of a conductive material, and have a three-layer structure in which, for example, Cu having low electric resistance and excellent stress resistance, Ni having excellent corrosion resistance, and Au having excellent solder wettability and reliability are arranged in this order from the inside to the outside.

The first external terminal 41 is in contact with the end face of the first columnar wire 31 exposed from the first principal surface 10*a* of the element body 10 and is electrically connected to the first columnar wire 31. As a result, the first external terminal 41 is electrically connected to the first end 21*a* of the first inductor wire 21. The second external terminal 42 is in contact with the end face of the second columnar wire 32 exposed from the first principal surface 10*a* of the element body 10 and is electrically connected to the second columnar wire 32. As a result, the second external terminal 42 is electrically connected to the second end 21*b* of the first inductor wire 21 and the second end 22*b* of the second inductor wire 22. The third external terminal 43 is in contact with the end face of the third columnar wire 33, is electrically connected to the third columnar wire 33, and is electrically connected to the first end 22*a* of the second inductor wire 22.

Each of a bottom surface of the first inductor wire 21 and a bottom surface of the second inductor wire 22 is covered with an insulating layer 61. The insulating layer 61 is made of an insulating material including no magnetic body, and is made of a resin material such as an epoxy-based resin, a phenol-based resin, or a polyimide-based resin. Note that the insulating layer 61 may contain a non-magnetic filler such as silica, and in this case, the strength, processability, and electrical characteristics of the insulating layer 61 can be improved.

Figure 3:
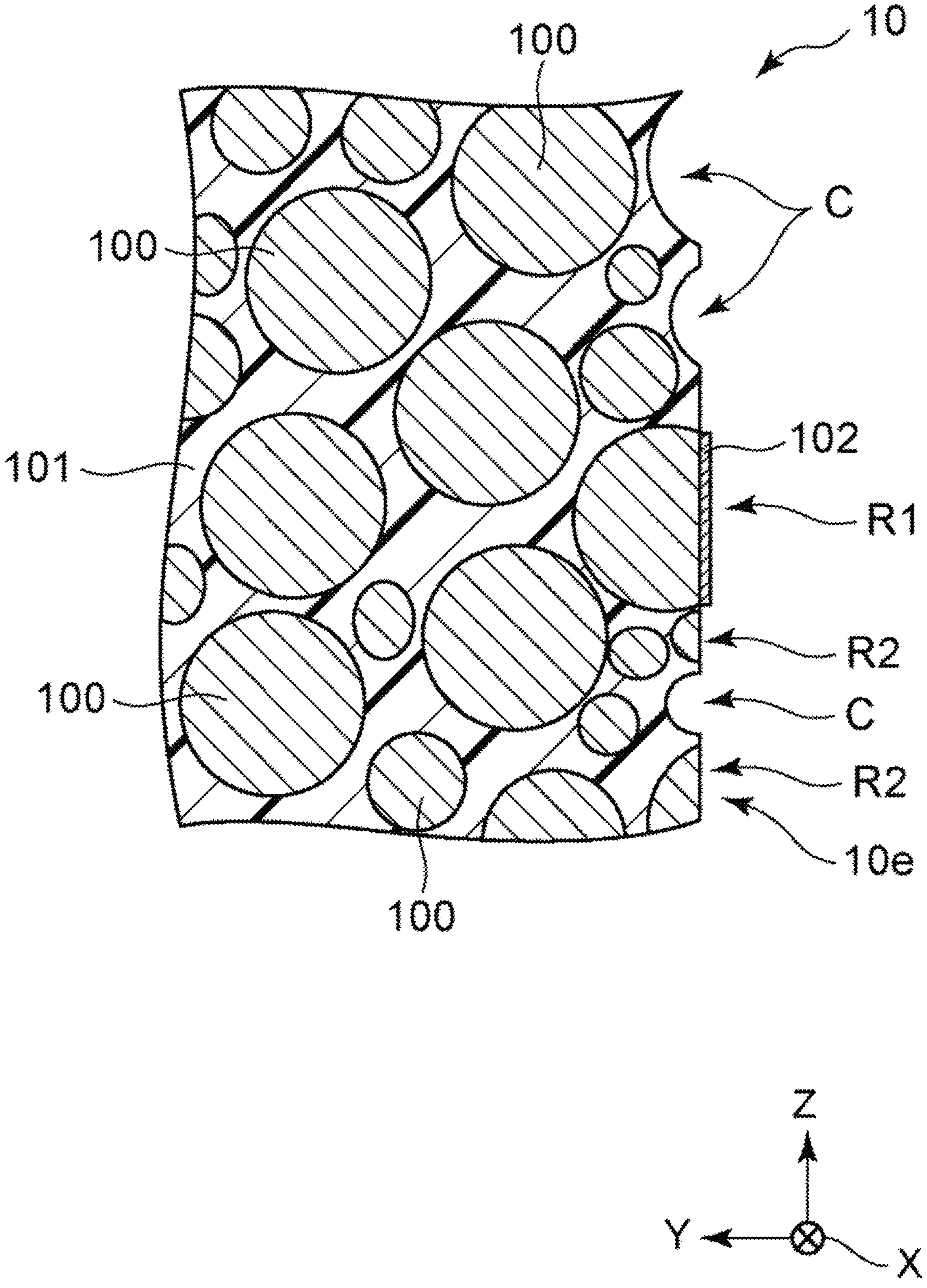
FIG. 3 is an enlarged view of a portion A in FIG. 2B.

FIG. 3 is an enlarged view of a portion A in FIG. 2B. As illustrated in FIG. 3, the first magnetic layer 11 and the second magnetic layer 12 include a magnetic powder 100 and a resin 101 containing the magnetic powder 100. The magnetic powder 100 contains an Fe element as a main component. The fact that the magnetic powder 100 contains the Fe element as the main component means that the magnetic powder 100 is made of a simple substance of Fe or an Fe-based alloy in which Fe has the largest element amount among the element amounts, and is, for example, a metal magnetic powder such as FeSi, FeSiCr, FeSiAl, or FeNi. Note that the magnetic powder 100 may have an amorphous structure or a crystal structure.

The third side surface 10*e* of the element body 10 has an oxidized region R1 where the oxide film 102 formed by oxidizing the plurality of magnetic powders 100 is exposed, a non-oxidized region R2 where the plurality of magnetic powders 100 are exposed, and a recess C. The oxidized region R1 refers to a region where the Fe element is 65 wt % or more and the O element is 24 wt % or more. The non-oxidized region R2 refers to a region where the Fe element is 65 wt % or more and the O element is less than 24 wt %. That is, in other words, the third side surface 10*e* of the element body 10 has the oxidized region R1 where the Fe element is 65 wt % or more and the O element is 24 wt % or more on the plurality of magnetic powders 100, and the non-oxidized region R2 where the plurality of magnetic powders 100 are exposed.

For composition analysis of the oxidized region R1 and the non-oxidized region R2, analysis is performed from a scanning electron microscope (SEM) image of the third side surface 10*e* by energy dispersive X-ray spectroscopy (EDX). Specifically, in the SEM image, imaging is performed at a magnification at which a plurality of magnetic powders 100 are contained, for example, 300 times, and point analysis is performed on the oxidized region R1 and the non-oxidized region R2 by EDX or composition analysis is performed by selecting only the corresponding area. Here, there is a case where C which is a resin component of the magnetic layer, a component derived from the insulating filler, a metal component used in vapor deposition, and the like are detected as noise. The composition of the magnetic powder excluding these components and the O element as an oxidizing component are used as a denominator, and a ratio of the corresponding composition (the Fe element and the O element) is calculated. As the separation between the noise and the elements included in the denominator as the composition of the magnetic powder, a center portion of the element body is exposed in advance by section polishing, a composition detected on a cut section of the magnetic powder exposed on the section is used as a reference, and elements other than the O element in a composition that is not detected are set as the noise.

The recess C can be provided by shedding the magnetic powder 100 from the side surface of the element body when the inductor component 1 is cut with the dicing machine. A shape of an inner surface of the recess C is preferably a hemispherical shape. As a result, the mechanical stress is dispersed on the inner surface of the recess, and the strength of the element body 10 can be secured. Since the recess C is provided in the third side surface 10*e*, the surface area of the third side surface 10*e* increases, and the heat dissipation of the inductor component 1 can be improved. Therefore, the recess C is preferably provided in the third side surface 10*e*, but may not be provided. In this case, since the cut magnetic powder 100 exists instead of the recess C, the inductance is improved.

Note that, in the above description, the third side surface 10*e* is taken as an example, but the oxidized region R1, the non-oxidized region R2, and the recess C may be provided on one or more side surfaces among the first side surface 10*c*, the second side surface 10*d*, the third side surface 10*e*, and the fourth side surface 10*f*.

When the mounting density of the components is increased, the distance between the components is shortened, and the external terminals and the first to fourth side surfaces 10*c* to 10*f* of the element body 10 may be in contact with each other in the adjacent components. In this case, the short circuit may occur through the magnetic powder 100. According to the inductor component 1, by the oxidized region R1 provided on the first to fourth side surfaces 10*c* to 10*f* of the element body 10, it is possible to increase the electric resistance of the magnetic powder 100 to suppress the short circuit. In addition, by the non-oxidized region R2 provided on the first to fourth side surfaces 10*c* to 10*f*, it is possible to suppress a decrease in the element body strength and a decrease in the inductance. In addition, since the first inductor wire 21 and the second inductor wire 22 are formed in one layer, the inductor component 1 can be thinned.

As illustrated in FIG. 3, the magnetic powder 100 in the oxidized region R1 includes magnetic powder in direct contact with the resin 101. Specifically, the magnetic powder 100 includes magnetic powder that is not coated with an oxide film in advance. According to the above configuration, since the magnetic powder 100 in the oxidized region R1 is in direct contact with the resin 101, the close contact between the magnetic powder 100 and the resin 101 is improved, and it is possible to more effectively suppress a decrease in the element body strength and a decrease in the inductance.

Alternatively, although not illustrated in the drawings, the magnetic powder 100 in the oxidized region R1 includes magnetic powder in contact with the resin 101 with the oxide film interposed therebetween. Specifically, the magnetic powder 100 includes magnetic powder coated with an oxide film in advance. According to the above configuration, since the magnetic powder 100 in the oxidized region R1 is in contact with the resin 101 with the oxide film interposed therebetween, it is possible to more effectively suppress the short circuit. The magnetic powder 100 in the oxidized region R1 may include magnetic powder in which a part of a surface embedded in the resin 101 is covered with an oxide film and the remaining part is not covered with the oxide film. That is, the magnetic powder 100 in the oxidized region R1 may include magnetic powder whose part is in direct contact with the resin 101 and whose part is in contact with the resin 101 with the oxide film interposed therebetween.

Preferably, in the oxidized region R1, a ratio of a reflectance of a wavelength of 600 nm or more and 800 nm or less (i.e., from 600 nm to 800 nm) to a reflectance of a wavelength of less than 600 nm is larger than that in the non-oxidized region R2. According to the above configuration, red reflection is larger in the oxidized region R1 than in the non-oxidized region R2. Therefore, since the oxidized region R1 looks red (warm color), it is possible to easily grasp that the oxidized region R1 is formed visually or by an appearance inspection apparatus or the like, and it is possible to confirm having short-circuit resistance from the appearance.

Preferably, the oxide film 102 is formed on the cut section of the magnetic powder 100. According to the above configuration, when the element body 10 is ground to reduce the thickness of the element body, the magnetic powder 100 is cut to expose the cut section of the magnetic powder 100. However, since the oxide film 102 is formed on the cut section of the magnetic powder 100, short-circuit resistance can be improved.

On the other hand, there is known magnetic powder whose surface is coated with an organic or inorganic substance such as phosphoric acid or $SiO_2$ to improve an insulating property. By disposing such magnetic powder on an outermost surface, an insulating property of a chip surface can be improved. However, in order to manufacture a thin inductor component, it is necessary to adjust the thickness by grinding the element body (magnetic layer). In this case, a surface protection film on the surface of the magnetic powder is peeled off, and the inside of the magnetic powder is exposed, so that short-circuit resistance is deteriorated. Therefore, in the present embodiment, by forming the oxide film 102 on the inside of the exposed magnetic powder 100 in which the insulation resistance is deteriorated, the short-circuit resistance is improved, and the thickness is not unnecessarily increased. However, the oxide film 102 may be formed on a surface that is not the cut section of the magnetic powder 100. As can be assumed from the above, in the oxidized region R1, the portion of the magnetic powder 100 embedded in the resin 101 is not limited to the case where the magnetic powder 100 is coated with the oxidized oxide film 102, and may be coated with an organic or inorganic substance such as phosphoric acid or $SiO_2$.

Preferably, the thickness of the oxide film 102 is smaller than D50 of the grain diameter of the magnetic powder 100. According to the above configuration, the excessive progress of oxidation causes problems due to the decrease in the strength of the element body 10 and the shedding of the magnetic powder 100, but since the oxide film 102 is thinner than one grain of the magnetic powder 100, the problems can be avoided.

Here, unless otherwise specified, D50 of the grain diameter of the magnetic powder 100 is measured from an SEM image of a transverse section of a center portion in the longitudinal direction of the element body 10 of the inductor component. At this time, the SEM image preferably contains 10 or more magnetic powders 100, and is acquired at a magnification of, for example, 2000 times. The SEM image described above is acquired at three or more places from the transverse section, the magnetic powder 100 and the others are classified by binarization or the like, an equivalent circle diameter of each magnetic powder 100 in the SEM image is calculated, and an intermediate value (median diameter) when arranged in order of the size of the equivalent circle diameter is defined as D50 of the grain diameter of the magnetic powder 100. In addition, the equivalent circle diameters are stacked in ascending order of equivalent circle diameters, and the equivalent circle diameter when the number exceeds 90% of the total for the first time is defined as D90 of the grain diameter of the magnetic powder 100.

Preferably, D50 of the grain diameter of the magnetic powder 100 in the oxidized region is larger than D50 of the grain diameter of the magnetic powder 100 in the non-oxidized region. According to the above configuration, the magnetic powder 100 having a large grain diameter is easily oxidized, and the oxidized region can be easily formed.

Preferably, the first side surface 10*c* from which the first extended wire 201 is exposed has the oxidized region R1. According to the above configuration, when a plurality of inductor wires 21 and 22 are provided, the insulation resistance between the adjacent first extended wires 201 and 201 on the first side surface 10*c* can be increased. Further, when the plurality of inductor components 1 are disposed, the insulation resistance between the first extended wires 201 and 201 of the adjacent inductor components 1 can be increased. Similarly, the second side surface 10*d* from which the second extended wire 202 is exposed may have the oxidized region R1.

Preferably, there is a plurality of inductor wires, and the plurality of inductor wires are disposed on the same plane parallel to the first principal surface 10*a* and electrically separated from each other. According to the above configuration, an inductor array can be configured, and the density of the inductance can be increased.

Preferably, the first principal surface 10*a* of the element body 10 has the oxidized region R1 and the non-oxidized region R2. According to the above configuration, the oxidized region R1 can suppress the short circuit between the first external terminal 41 and the second external terminal 42 and between the third external terminal 43 and the second external terminal 42 through the magnetic powder 100 on the first principal surface 10*a*, and the non-oxidized region R2 can suppress a decrease in strength and a decrease in inductance of the element body 10.

(Manufacturing Method)

Next, a method for manufacturing the inductor component 1 will be described. FIGS. 4A to 4I correspond to a section (FIG. 2B) taken along the line B-B of FIG. 1.

Figure 4A:
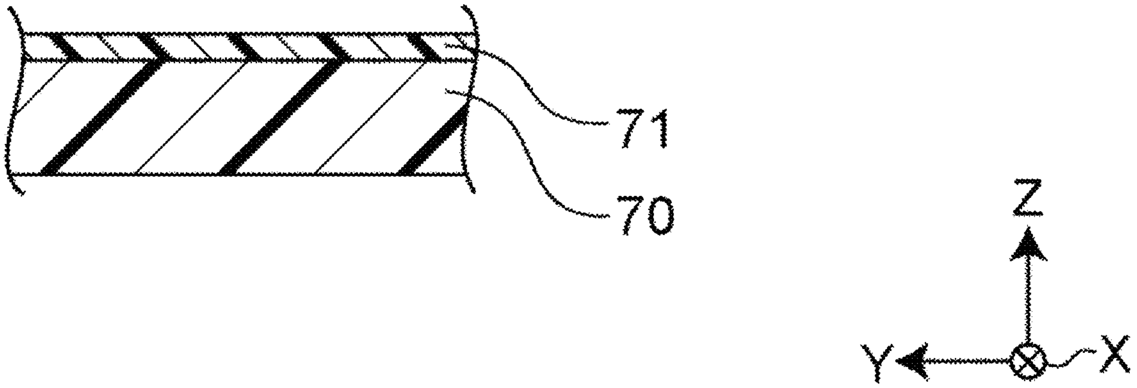
FIG. 4A is an explanatory diagram illustrating a manufacturing method of the inductor component.

As illustrated in FIG. 4A, a base substrate 70 is prepared. The base substrate 70 is made of, for example, an inorganic material such as ceramic, glass, or silicon. A first insulating layer 71 is applied onto a principal surface of the base substrate 70 to solidify the first insulating layer 71.

Figure 4B:
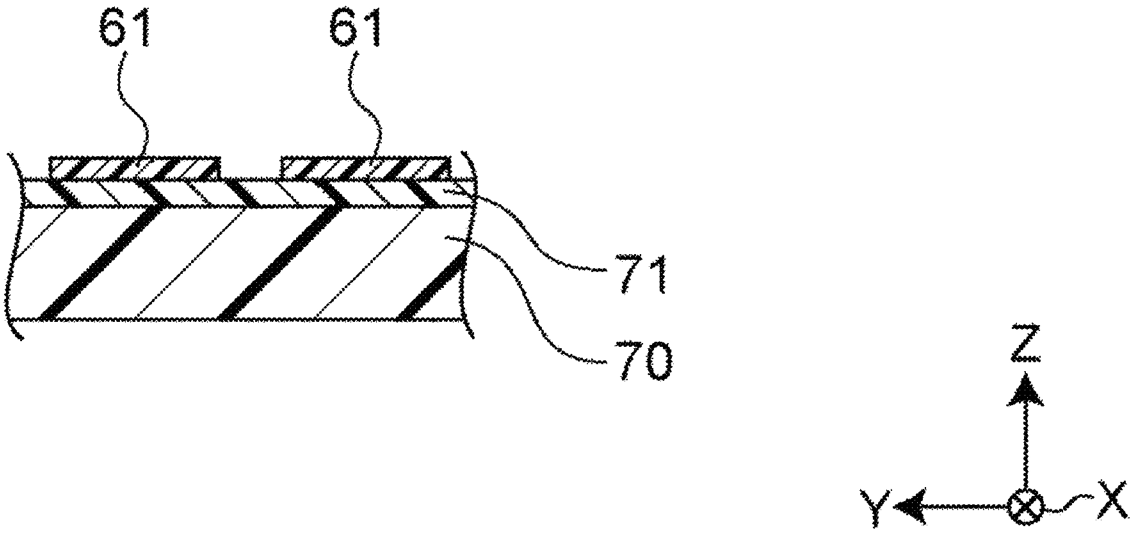
FIG. 4B is an explanatory diagram illustrating a manufacturing method of the inductor component.

As illustrated in FIG. 4B, a second insulating layer 61 is applied onto the first insulating layer 71, and a predetermined pattern is formed using a photolithography method and solidified.

Figure 4C:
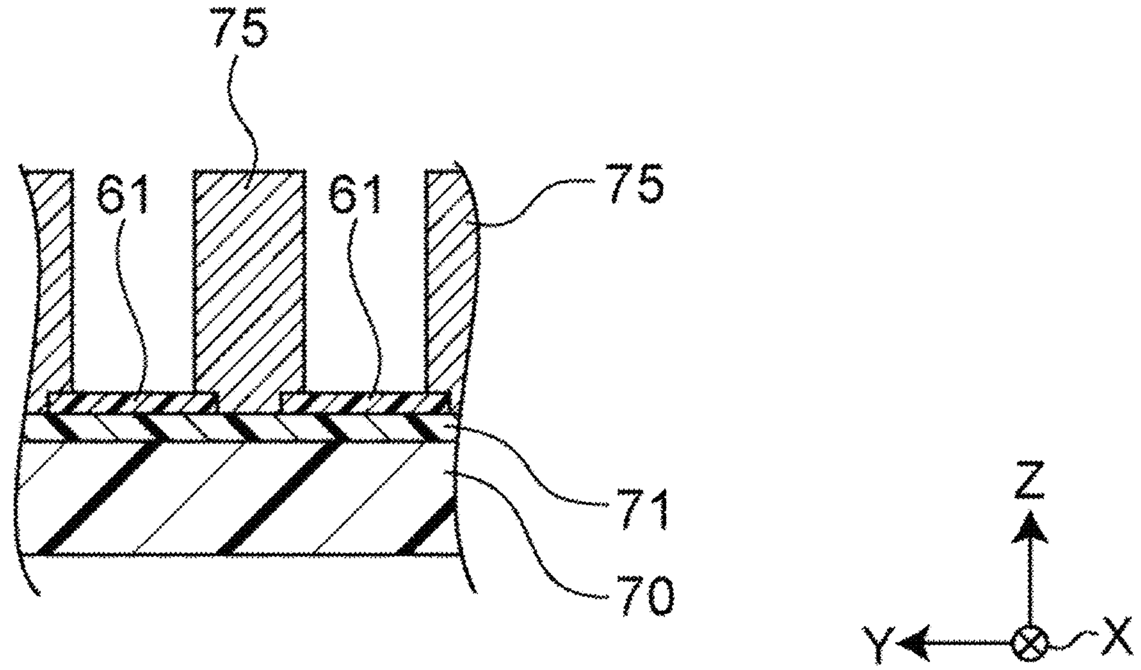
FIG. 4C is an explanatory diagram illustrating a manufacturing method of the inductor component.

As illustrated in FIG. 4C, a seed layer not illustrated in the drawings is formed on the first insulating layer 71 and the second insulating layer 61 by a known method such as a sputtering method or a vapor deposition method. Thereafter, a dry film resist (DFR) 75 is attached, and a predetermined pattern is formed on the DFR 75 using a photolithography method. The predetermined pattern is a through hole corresponding to a position where the first inductor wire 21 and the second inductor wire 22 are provided on the second insulating layer 61.

Figure 4D:
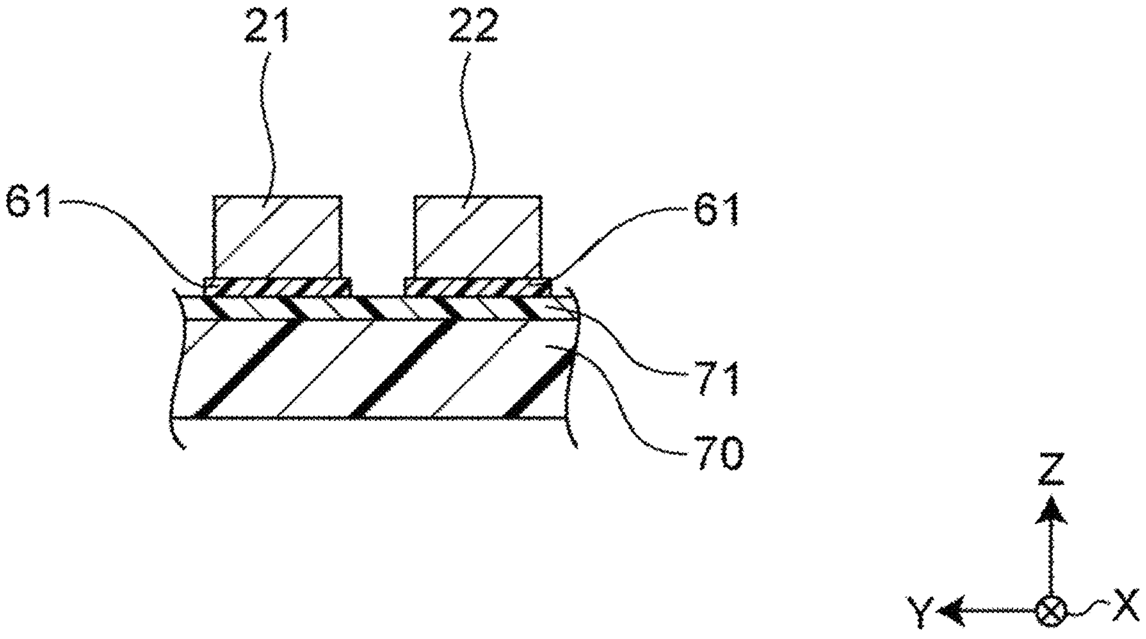
FIG. 4D is an explanatory diagram illustrating a manufacturing method of the inductor component.

As illustrated in FIG. 4D, while power is supplied to the seed layer, the first inductor wire 21 and the second inductor wire 22 are formed on the second insulating layer 61 using an electrolytic plating method. Thereafter, the DFR 75 is peeled off, and the seed layer is etched. In this way, the first inductor wire 21 and the second inductor wire 22 are formed on the principal surface of the base substrate 70.

Figure 4E:
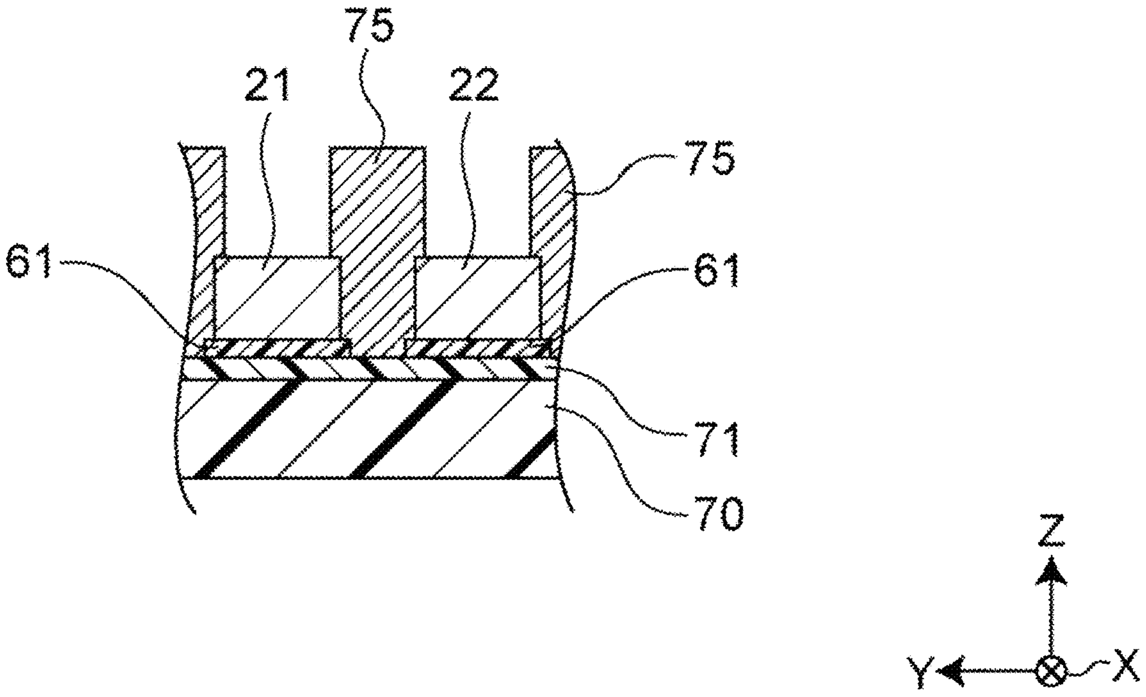
FIG. 4E is an explanatory diagram illustrating a manufacturing method of the inductor component.

As illustrated in FIG. 4E, the DFR 75 is attached again, and a predetermined pattern is formed on the DFR 75 using a photolithography method. The predetermined pattern is a through hole corresponding to a position where the first columnar wire 31, the second columnar wire 32, and the third columnar wire 33 on the first inductor wire 21 and the second inductor wire 22 are provided.

Figure 4F:
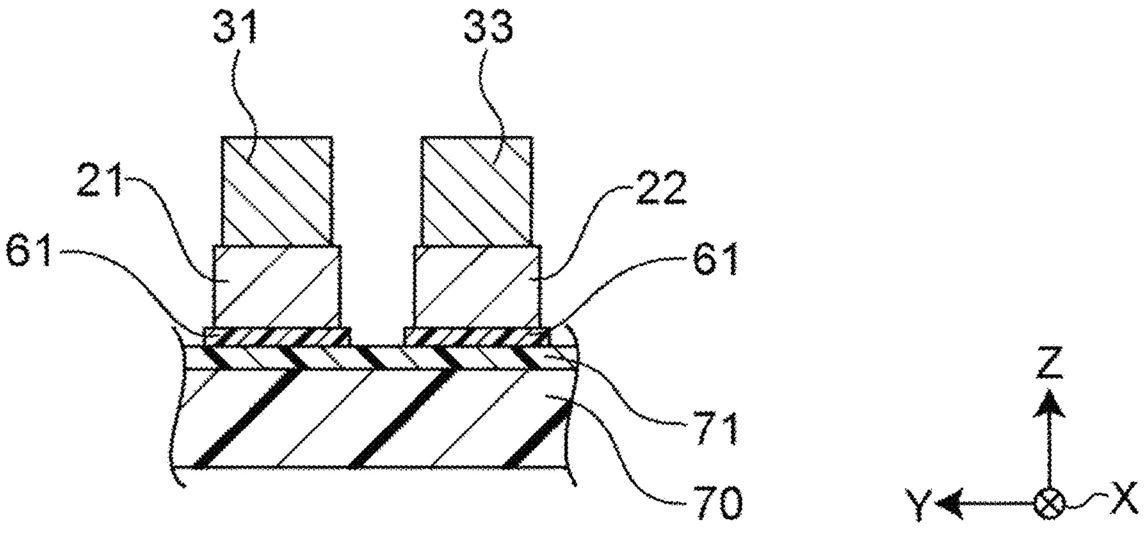
FIG. 4F is an explanatory diagram illustrating a manufacturing method of the inductor component.

As illustrated in FIG. 4F, the first columnar wire 31, the second columnar wire 32, and the third columnar wire 33 are formed on the first inductor wire 21 and the second inductor wire 22 using electrolytic plating. Thereafter, the DFR 75 is peeled off. Note that a seed layer may be used for electrolytic plating, and in this case, it is necessary to etch the seed layer. In addition, the seed layer at the time of forming the first inductor wire 21 and the second inductor wire 22 may be left without being etched, and power may be supplied through the seed layer to form the first columnar wire 31, the second columnar wire 32, and the third columnar wire 33. Also in this case, the seed layer needs to be etched.

Figure 4G:
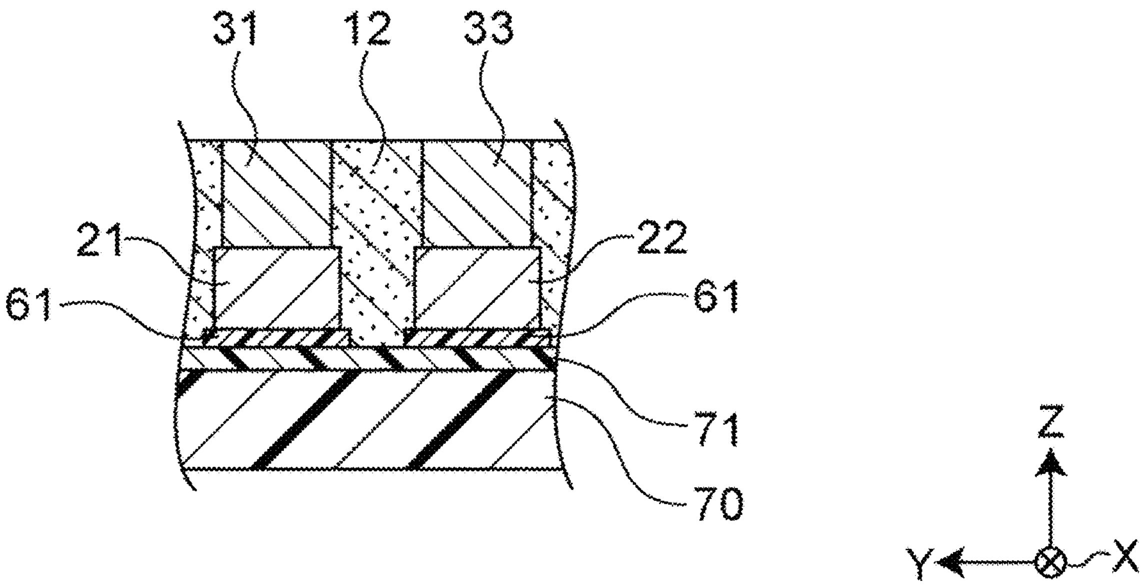
FIG. 4G is an explanatory diagram illustrating a manufacturing method of the inductor component.

As illustrated in FIG. 4G, the magnetic sheet to be the second magnetic layer 12 is pressure-bonded from above the principal surface of the base substrate 70 toward the first inductor wire 21 and the second inductor wire 22, and the first inductor wire 21, the second inductor wire 22, the first columnar wire 31, the second columnar wire 32, and the third columnar wire 33 are covered with the second magnetic layer 12. Thereafter, a top surface of the second magnetic layer 12 is ground, and end faces of the first columnar wire 31, the second columnar wire 32, and the third columnar wire 33 are exposed from the top surface of the second magnetic layer 12. In order to reduce deterioration of the magnetic powder due to an environmental load, a surface protection film made of an inorganic material such as glass or silicon, a resin, or the like may be used. As described above, when the magnetic powder is covered with the surface protection film, the surface protection film is peeled off by grinding, so that the surface of the magnetic powder can be oxidized.

Figure 4H:
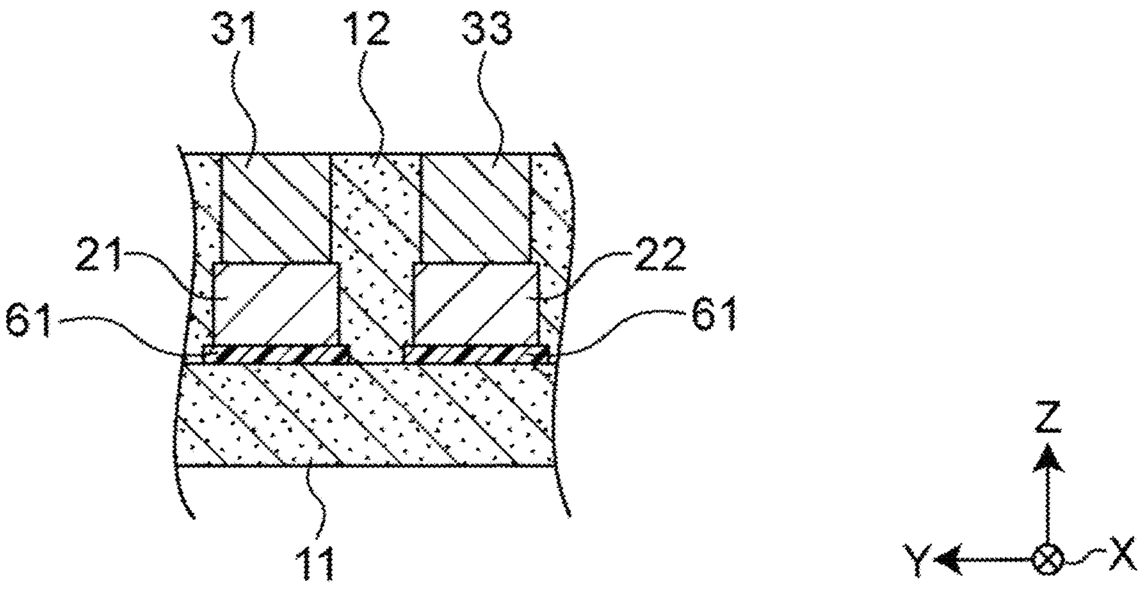
FIG. 4H is an explanatory diagram illustrating a manufacturing method of the inductor component.

As illustrated in FIG. 4H, the base substrate 70 and the first insulating layer 71 are removed by polishing. At this time, the base substrate 70 and the first insulating layer 71 may be removed by peeling with the first insulating layer 71 as a peeling layer. Thereafter, another magnetic sheet to be the first magnetic layer 11 is pressure-bonded from below the first inductor wire 21 and the second inductor wire 22 toward the first inductor wire 21 and the second inductor wire 22, and the first inductor wire 21 and the second inductor wire 22 are covered with the first magnetic layer 11. Thereafter, the first magnetic layer 11 is ground to a predetermined thickness.

Figure 4I:
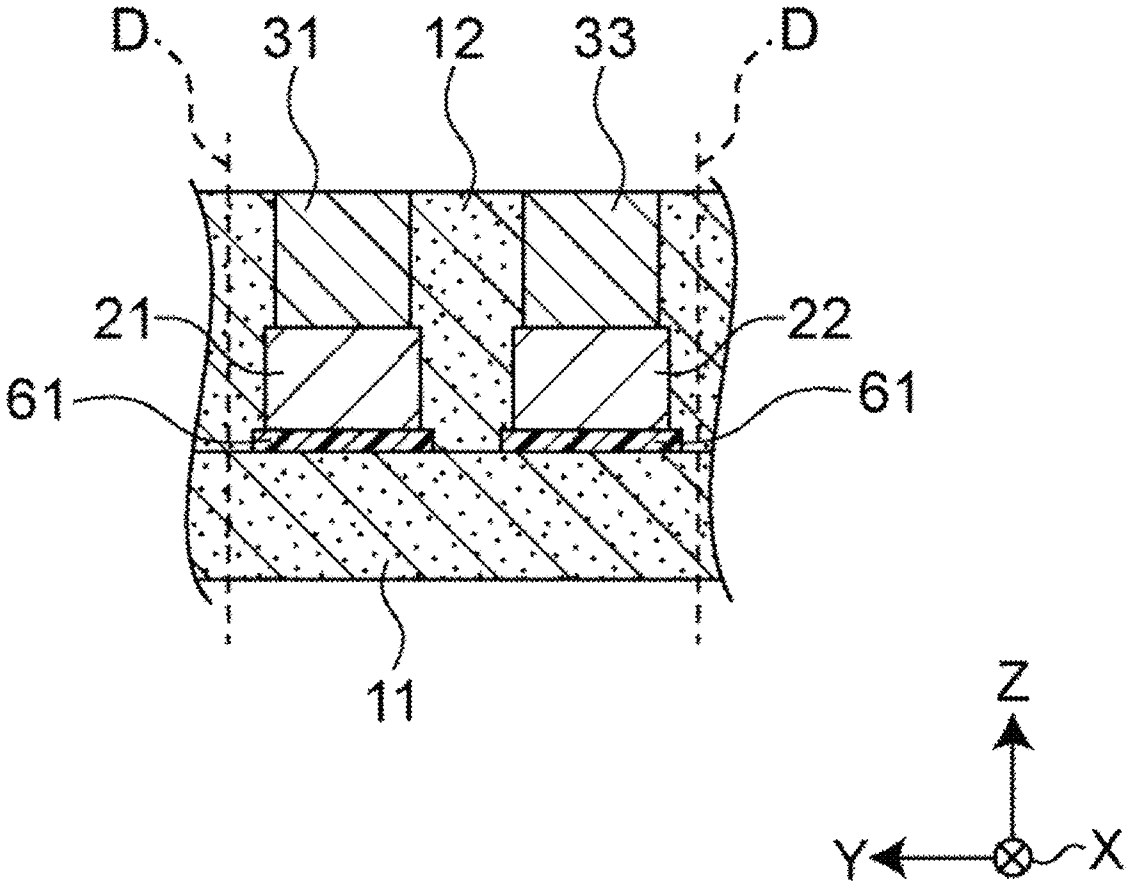
FIG. 4I is an explanatory diagram illustrating a manufacturing method of the inductor component.

As illustrated in FIG. 4I, the inductor component 1 is cut with the dicing machine along a cutting line D. At the time of cutting with the dicing machine or after cutting with the dicing machine, the oxidized region and the non-oxidized region are preferably formed on the element body side surface, and the recess is preferably formed at the time of cutting with the dicing machine. For example, the oxidized region and the non-oxidized region may be formed on the element body side surface by using water washing and drying at the time of cutting with the dicing machine. Specifically, in the water washing at the time of cutting with the dicing machine, water is also applied to the element body side surface. Then, for example, by adjusting a water washing time or a drying time, an oxide film is formed on the magnetic powder having a large grain diameter, and the oxidized region and the non-oxidized region can be easily formed. Alternatively, after the inductor component 1 is cut with the dicing machine, the element body side surface may be washed with water at the same time as the impurity removal of the element body side surface to form the oxidized region and the non-oxidized region. Also in this case, for example, by adjusting the water washing time or the drying time, an oxide film can be formed on the magnetic powder having a large grain diameter, and the oxidized region and the non-oxidized region can be easily formed. The recess can be formed, for example, by controlling a cutting speed at the time of cutting with the dicing machine, a rotation speed of a dicing blade, and the like to promote the shedding of the magnetic powder.

Thereafter, a metal film is formed on the columnar wires 31 to 33 by electroless plating to form the first external terminal 41, the second external terminal 42, and the third external terminal 43. As a result, as illustrated in FIG. 2B, the inductor component 1 is manufactured.

EXAMPLES

Figure 5A:
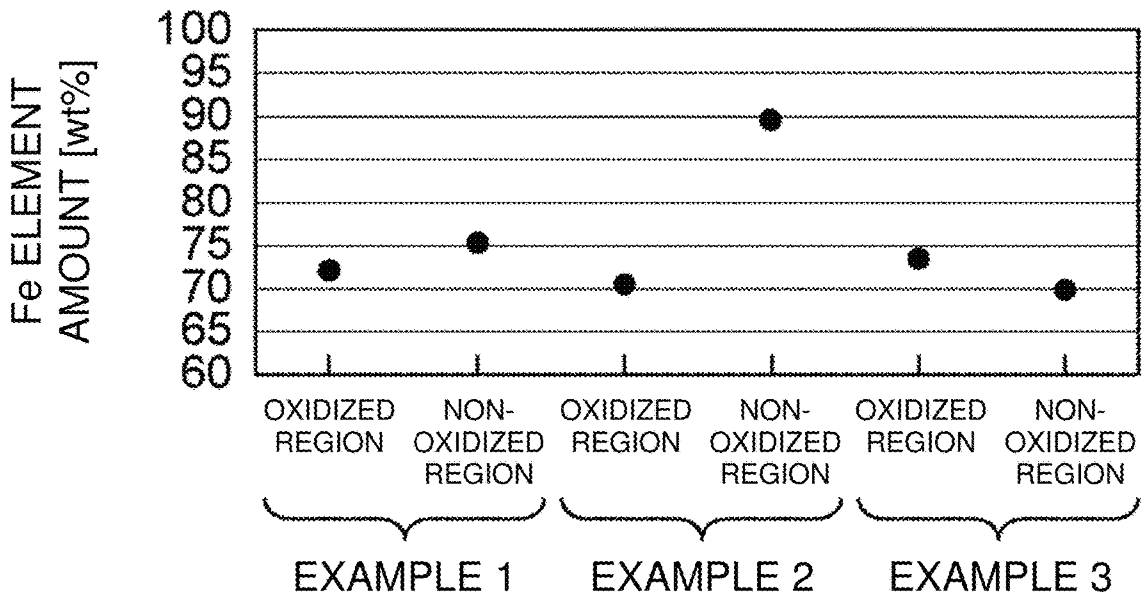
FIG. 5A is a graph illustrating the Fe element amount [wt %] of each of an oxidized region and a non-oxidized region in Examples 1 to 3.
Figure 5B:
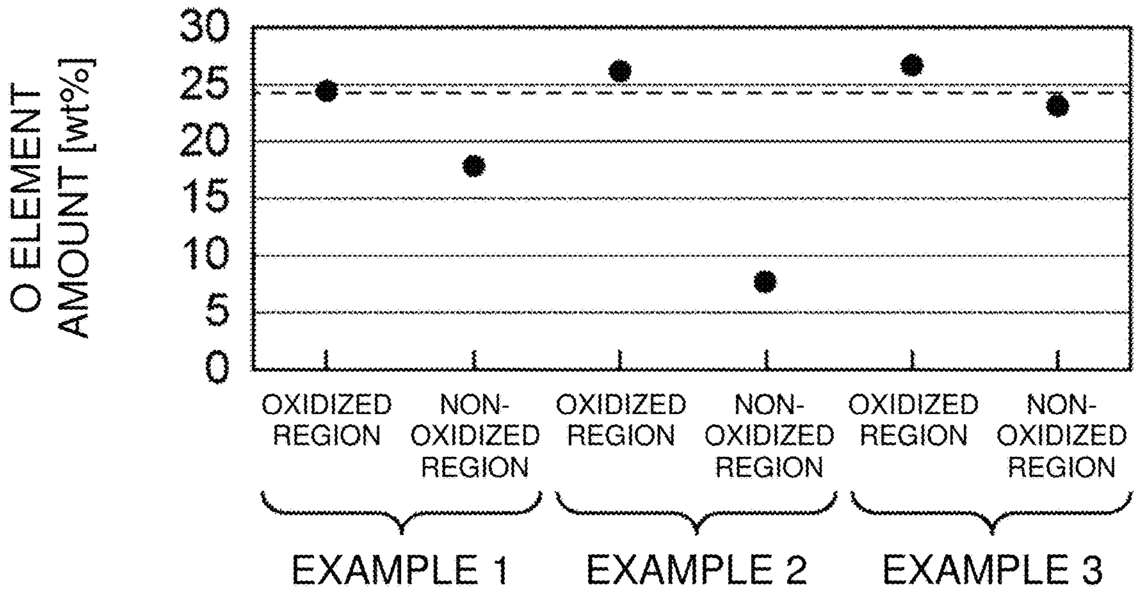
FIG. 5B is a graph illustrating the O element amount [wt %] of each of an oxidized region and a non-oxidized region in Examples 1 to 3.

Next, in Example 1, Example 2, and Example 3, the Fe element amount and the O element amount of each of the oxidized region and the non-oxidized region were calculated. FIG. 5A is a graph illustrating the Fe element amount [wt %] of each of the oxidized region and the non-oxidized region in Examples 1 to 3. FIG. 5B is a graph illustrating the O element amount [wt %] of each of the oxidized region and the non-oxidized region in Examples 1 to 3.

In Example 1, the composition of the magnetic powder is FeSi, and D50 of the grain diameter of the magnetic powder is 15 μm. In Example 2, the composition of the magnetic powder is FeSi, the Fe amount in Example 2 is 1.2 when the Fe amount in Example 1 is 1, and D50 of the grain diameter of the magnetic powder is 16 μm. In Example 3, the composition of the magnetic powder is FeSiCr, the Fe amount in Example 3 is 0.9 when the Fe amount in Example 1 is 1, and D50 of the grain diameter of the magnetic powder is 3 μm.

As illustrated in FIG. 5A, in Example 1, the Fe element in the oxidized region was 72 wt %, and the Fe element in the non-oxidized region was 75 wt %. In Example 2, the Fe element in the oxidized region was 71 wt %, and the Fe element in the non-oxidized region was 90 wt %. In Example 3, the Fe element in the oxidized region was 73 wt %, and the Fe element in the non-oxidized region was 70 wt %.

As illustrated in FIG. 5B, in Example 1, the O element in the oxidized region was 24 wt %, and the O element in the non-oxidized region was 18 wt %. In Example 2, the O element in the oxidized region was 26 wt %, and the O element in the non-oxidized region was 8 wt %. In Example 3, the O element in the oxidized region was 27 wt %, and the O element in the non-oxidized region was 23 wt %. In FIG. 5B, the position of 24 wt % is indicated by a dotted line.

Therefore, in the oxidized region, the Fe element is 65 wt % or more and the O element is 24 wt % or more. In the non-oxidized region, the Fe element is 65 wt % or more and the O element is less than 24 wt %.

Second Embodiment

Figure 6:
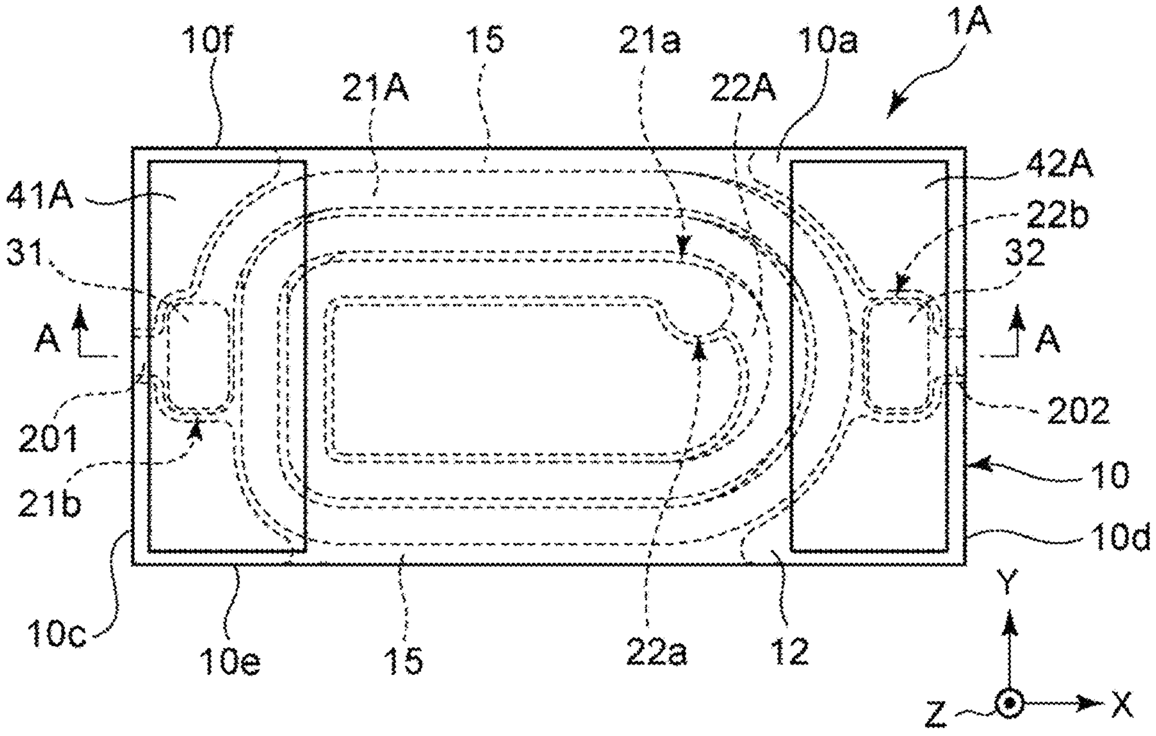
FIG. 6 is a plan view illustrating a second embodiment of the inductor component.
Figure 7:
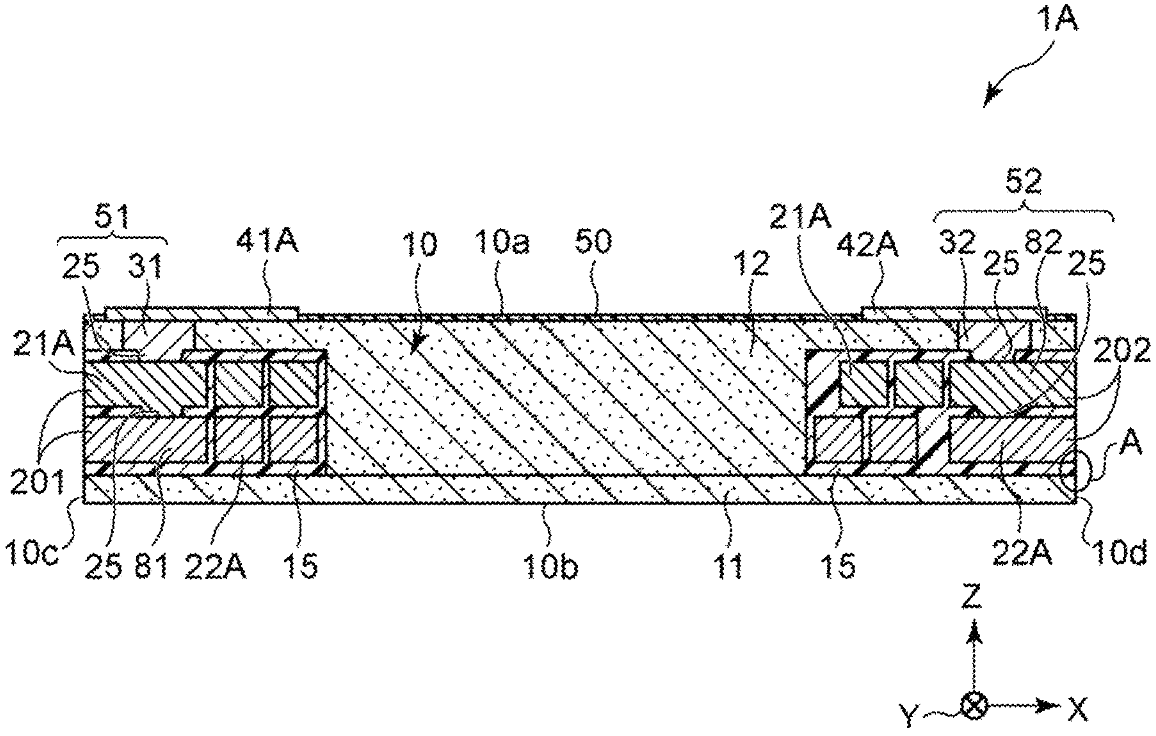
FIG. 7 is a sectional view taken along the line A-A of FIG. 6.

FIG. 6 is a plan view illustrating a second embodiment of the inductor component. FIG. 7 is a sectional view taken along the line A-A of FIG. 6. The second embodiment is different from the first embodiment in configurations of an inductor wire, a vertical wire, and an external terminal. The different configurations will be described below. Note that, in the second embodiment, since the same reference numerals as those in the first embodiment denote the same configurations as those in the first embodiment, the description thereof will be omitted.

As illustrated in FIGS. 6 and 7, an inductor component 1A includes an element body 10, a first inductor wire 21A and a second inductor wire 22A, an insulating layer 15, a first vertical wire 51 (a first columnar wire 31 and a via wire 25) and a second vertical wire 52 (a second columnar wire 32, a second connection wire 82, and a via wire 25), a first external terminal 41A and a second external terminal 42A, and a coating film 50. The first inductor wire 21A and the second inductor wire 22A, the insulating layer 15, and the first vertical wire 51 and the second vertical wire 52 are provided in the element body 10. The first and second external terminals 41A and 42A and the coating film 50 are provided on a first principal surface 10*a* of the element body 10. The element body 10 has a first magnetic layer 11 and a second magnetic layer 12 sequentially stacked along the forward Z direction.

The first inductor wire 21A is a wire that is provided above the second inductor wire 22A and extends in a spiral shape along the first principal surface 10*a* of the element body 10. The number of turns of the first inductor wire 21A is preferably more than one turn. As a result, inductance can be improved. For example, the first inductor wire 21A is spirally wound in a clockwise direction from an outer peripheral end 21*b* toward an inner peripheral end 21*a* when viewed from a Z direction. A conductive material of the first inductor wire 21A is similar to the conductive material of the first inductor wire 21 according to the first embodiment. The outer peripheral end 21*b* corresponds to a “first end”.

The second inductor wire 22A is a wire extending in a spiral shape along the first principal surface 10*a* of the element body 10. The number of turns of the second inductor wire 22A is preferably more than one turn. As a result, inductance can be improved. The second inductor wire 22A is spirally wound in a clockwise direction from an inner peripheral end 22*a* toward an outer peripheral end 22*b* when viewed from the Z direction. The second inductor wire 22A is disposed between the first inductor wire 21A and the first magnetic layer 11. As a result, each of the first inductor wire 21A and the second inductor wire 22A is disposed along a direction (Z direction) orthogonal to the first principal surface 10*a*. The conductive material of the second inductor wire 22A is similar to the conductive material of the first inductor wire 21 according to the first embodiment. The outer peripheral end 22*b* corresponds to a “second end”.

The outer peripheral end 21*b* of the first inductor wire 21A is connected to the first external terminal 41A with the first vertical wire 51 (the via wire 25 and the first columnar wire 31) on the outer peripheral end 21*b* interposed therebetween. The inner peripheral end 21*a* of the first inductor wire 21A is connected to the inner peripheral end 22*a* of the second inductor wire 22A with a via wire (not illustrated in the drawings) below the inner peripheral end 21*a* interposed therebetween.

The outer peripheral end 22*b* of the second inductor wire 22A is connected to the second external terminal 42 with the second vertical wire 52 (the second columnar wire 32, the second connection wire 82, and the via wire 25) on the outer peripheral end 22*b* interposed therebetween. With the above configuration, the first inductor wire 21A and the second inductor wire 22A are connected in series and electrically connected to the first external terminal 41 and the second external terminal 42.

Note that, in the present embodiment, the first connection wire 81 is provided on the same layer as the second inductor wire 22A. The first connection wire 81 is disposed below (reverse Z direction) the outer peripheral end 21*b* of the first inductor wire 21A, and is connected only to a bottom surface of the first inductor wire 21A with the via wire 25 interposed therebetween. The first connection wire 81 is not connected to the second inductor wire 22A and is electrically independent. By providing the first connection wire 81, the outer peripheral end 21*b* of the first inductor wire 21A can be provided in the same layer as the wound portion of the first inductor wire 21A, and disconnection or the like can be suppressed.

The insulating layer 15 is a film-like layer formed on the first magnetic layer 11, and covers at least the first and second inductor wires 21A and 22A. Specifically, the insulating layer 15 covers all bottom and side surfaces of the first and second inductor wires 21A and 22A, and covers top surfaces of the first and second inductor wires 21A and 22A except for connection portions with the via wire 25. The insulating layer 15 has a hole at a position corresponding to the inner peripheral portion of each of the first and second inductor wires 21A and 22A. A thickness of the insulating layer 15 between the top surface of the first magnetic layer 11 and the bottom surface of the second inductor wire 22A is, for example, 10 μm or less.

The insulating layer 15 is made of an insulating material that does not contain a magnetic body, and is made of a resin material such as an epoxy-based resin, a phenol-based resin, or a polyimide-based resin. Note that the insulating layer 15 may contain a non-magnetic filler such as silica, and in this case, the strength, processability, and electrical characteristics of the insulating layer 15 can be improved.

The first magnetic layer 11 is in close contact with the bottom surfaces of the second magnetic layer 12 and the insulating layer 15. The second magnetic layer 12 is disposed above the first magnetic layer 11. The first and second inductor wires 21A and 22A are disposed between the first magnetic layer 11 and the second magnetic layer 12. The second magnetic layer 12 is formed along the insulating layer 15 so as to cover not only portions on the first and second inductor wires 21A and 22A but also the inner peripheral portions of the first and second inductor wires 21A and 22A.

The first vertical wire 51 is made of a conductive material, extends in the Z direction from the first inductor wire 21A, and penetrates the inside of the second magnetic layer 12. The first vertical wire 51 includes a via wire 25 extending upward from the top surface of the outer peripheral end 21*b* of the first inductor wire 21A, and a first columnar wire 31 extending upward from the via wire 25 and penetrating the inside of the first magnetic layer 11.

The second vertical wire 52 is made of a conductive material, extends in the Z direction from the second inductor wire 22A, and penetrates the inside of the insulating layer 15 and the second magnetic layer 12. The second vertical wire 52 includes a via wire 25 extending upward from the top surface of the outer peripheral end 22*b* of the second inductor wire 22A, a second connection wire 82 extending upward from the via wire 25 and penetrating the inside of the insulating layer 15, a via wire 25 extending upward from the second connection wire 82, and a second columnar wire 32 extending upward from the via wire 25 and penetrating the inside of the second magnetic layer 12. The first and second vertical wires 51 and 52 are made of the same material as the first inductor wire 21A.

The first and second external terminals 41A and 42A are made of a conductive material, and have a three-layer configuration in which, for example, Cu having low electric resistance and excellent stress resistance, Ni having excellent corrosion resistance, and Au having excellent solder wettability and reliability are arranged in this order from the inside to the outside. A thickness of each layer of Cu/Ni/Au is, for example, 5/5/0.01 μm.

The first external terminal 41A is provided on the top surface (first principal surface 10*a*) of the second magnetic layer 12, and covers the end face of the first columnar wire 31 exposed from the top surface. As a result, the first external terminal 41A is electrically connected to the outer peripheral end 21*b* of the first inductor wire 21A. The second external terminal 42A is provided on the top surface of the second magnetic layer 12 and covers the end face of the second columnar wire 32 exposed from the top surface. As a result, the second external terminal 42A is electrically connected to the outer peripheral end 22*b* of the second inductor wire 22A.

The first and second external terminals 41A and 42A are preferably subjected to a rust prevention treatment. Here, the rust prevention treatment means coating with Ni and Au, Ni and Sn, or the like. As a result, copper corrosion due to solder or dust can be suppressed, and the inductor component 1A with high mounting reliability can be provided.

The coating film 50 is made of an insulating material, is provided on a top surface of the second magnetic layer 12, and exposes end faces of the first and second columnar wires 31 and 32 and the first and second external terminals 41 and 42. By the coating film 50, it is possible to suppress a short circuit between the first external terminal 41 and the second external terminal 42. The coating film corresponds to an "insulating layer". Note that the coating film 50 may be formed on the side of the bottom surface of the first magnetic layer 11.

Figure 8:
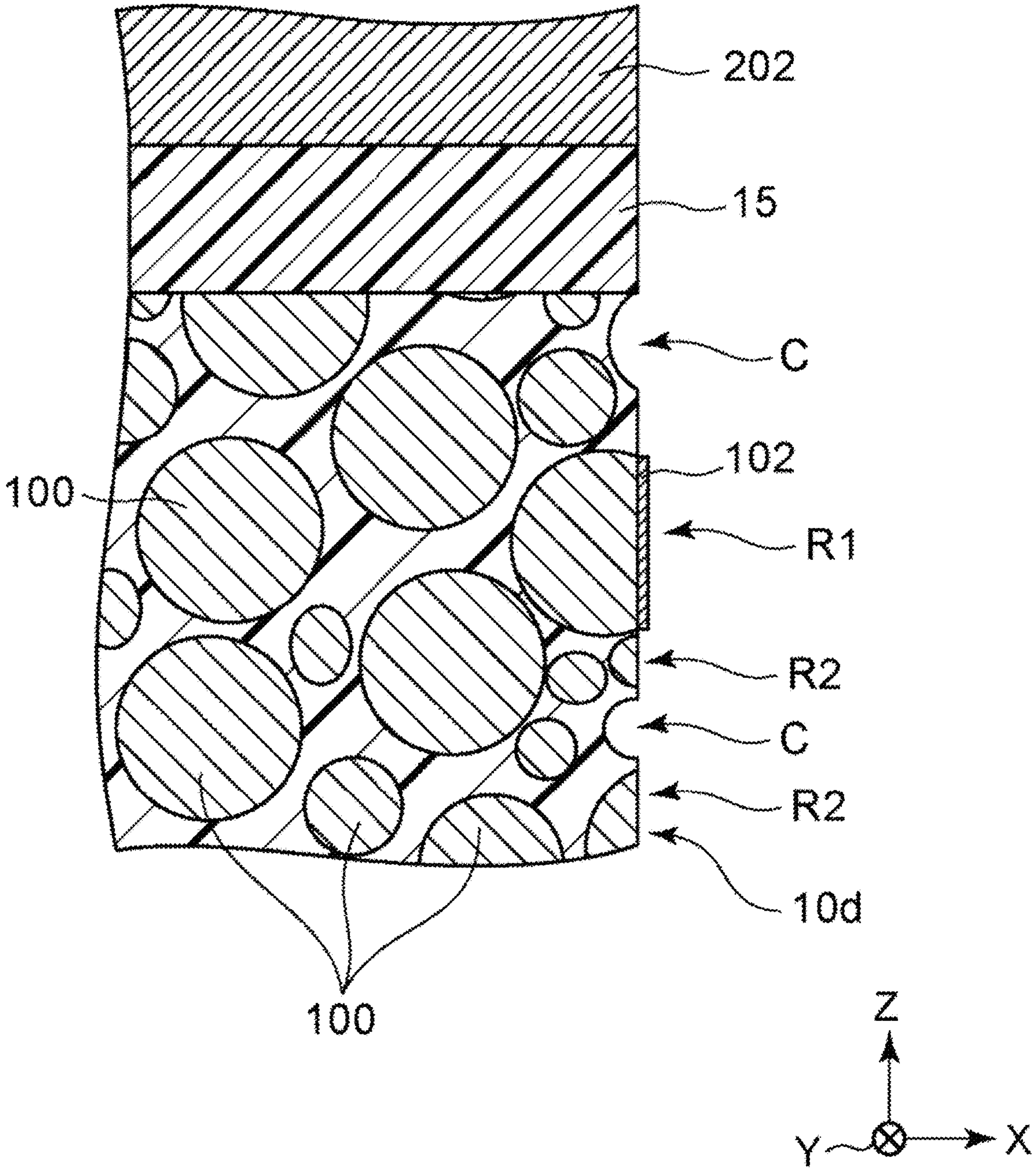
FIG. 8 is an enlarged view of a portion A in FIG. 7.

FIG. 8 is an enlarged view of a portion A in FIG. 7. As illustrated in FIG. 8, a second side surface 10*d* of the element body 10 has an oxidized region R1, a non-oxidized region R2, and a recess C. The configurations of the oxidized region R1, the non-oxidized region R2, and the recess C are similar to those of the first embodiment. Here, the second side surface 10*d* is taken as an example, but the oxidized region R1, the non-oxidized region R2, and the recess C may be provided on one or more side surfaces among the first side surface 10*c*, the second side surface 10*d*, the third side surface 10*e*, and the fourth side surface 10*f*. Further, the recess C is preferably provided on the element body side surface, but may not be provided.

According to the present embodiment, by the oxidized region R1 provided on the first to fourth side surfaces 10*c* to 10*f* of the element body 10, the electric resistance of the magnetic powder 100 can be increased to suppress the short circuit. In addition, by the non-oxidized region R2 provided on the first to fourth side surfaces 10*c* to 10*f*, it is possible to suppress a decrease in the element body strength and a decrease in the inductance. In addition, since the first inductor wire 21A and the second inductor wire 22A are disposed along the direction orthogonal to the first principal surface, the inductance density can be increased.

(Manufacturing Method)

Next, a method for manufacturing the inductor component 1A will be described. FIGS. 9A to 9M correspond to a section (FIG. 7) taken along the line A-A of FIG. 6.

Figure 9A:
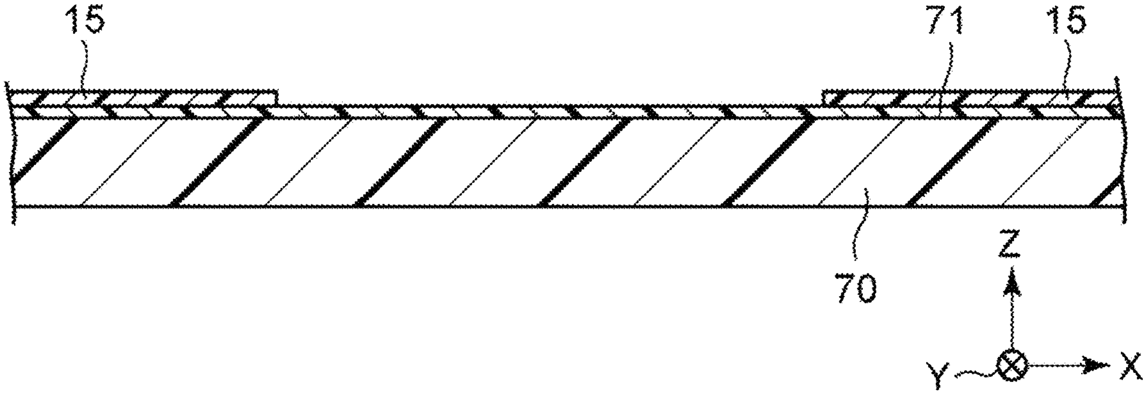
FIG. 9A is an explanatory diagram illustrating a manufacturing method of the inductor component.

As illustrated in FIG. 9A, a base substrate 70 is prepared. A first insulating layer 71 is applied onto a principal surface of the base substrate 70 to solidify the first insulating layer 71. The second insulating layer 15 is applied onto the first insulating layer 71, and a predetermined pattern is formed and solidified using a photolithography method.

Figure 9B:
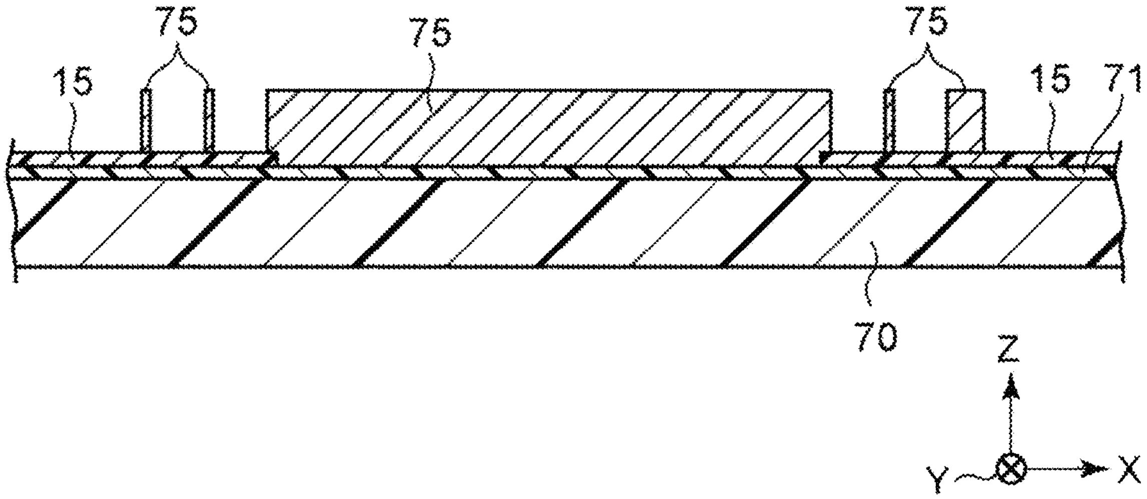
FIG. 9B is an explanatory diagram illustrating a manufacturing method of the inductor component.

As illustrated in FIG. 9B, a seed layer not illustrated in the drawings is formed on the first insulating layer 71 and the second insulating layer 15 by a known method such as a sputtering method or a vapor deposition method. Thereafter, a dry film resist (DFR) 75 is attached, and a predetermined pattern is formed on the DFR 75 using a photolithography method. The predetermined pattern is a through hole corresponding to a position where the second inductor wire 22A, the first connection wire 81, and the first and second extended wires 201 and 202 are provided on the second insulating layer 15.

Figure 9C:
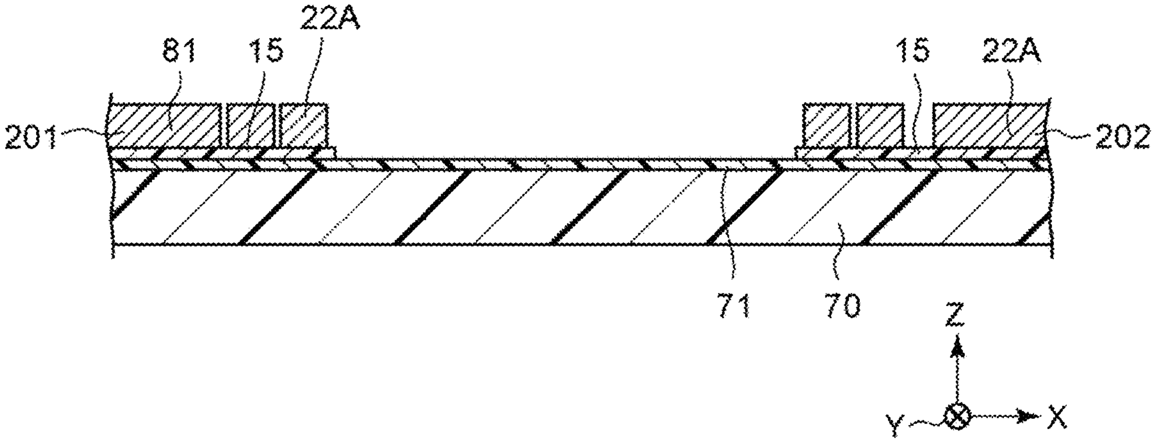
FIG. 9C is an explanatory diagram illustrating a manufacturing method of the inductor component.

As illustrated in FIG. 9C, while power is supplied to the seed layer, the second inductor wire 22A, the first connection wire 81, and the first and second extended wires 201 and 202 are formed on the second insulating layer 15 using an electrolytic plating method. Thereafter, the DFR 75 is peeled off, and the seed layer is etched.

Figure 9D:
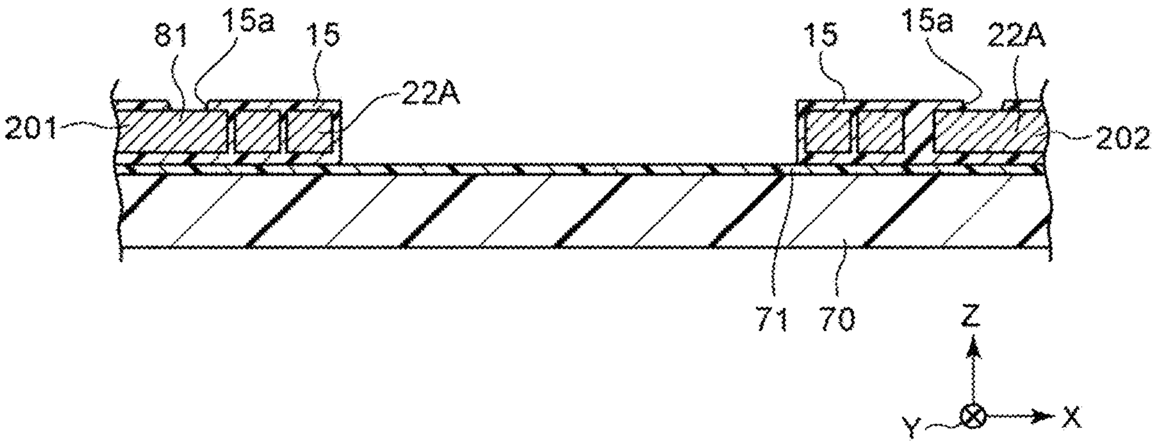
FIG. 9D is an explanatory diagram illustrating a manufacturing method of the inductor component.

As illustrated in FIG. 9D, the second insulating layer 15 is further applied so as to cover exposed surfaces of the second inductor wire 22A, the first connection wire 81, the first and second extended wires 201,202, and the first insulating layer 71. Then, the second insulating layer 15 is solidified by forming a via 15*a* corresponding to a position where the via wire 25 is provided and a through hole corresponding to a portion to be a magnetic path using a photolithography method.

Figure 9E:
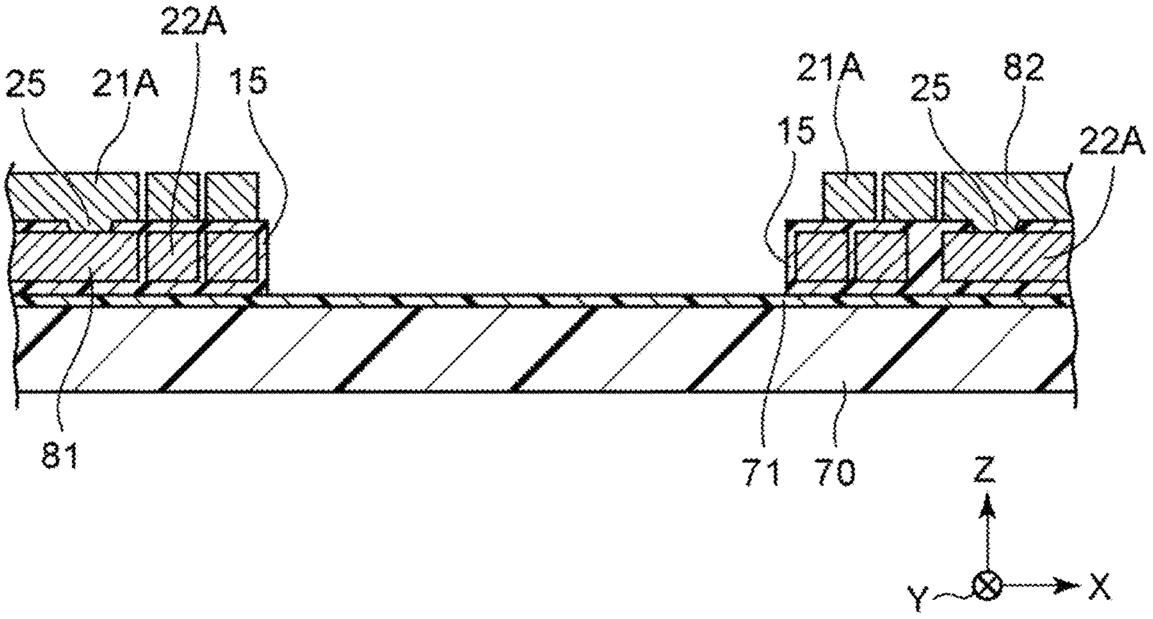
FIG. 9E is an explanatory diagram illustrating a manufacturing method of the inductor component.

As illustrated in FIG. 9E, a seed layer not illustrated in the drawings is formed on the first insulating layer 71 and the second insulating layer 15 by a known method such as a sputtering method or a vapor deposition method. Thereafter, a DFR is attached, and a predetermined pattern is formed in the DFR using a photolithography method. At this time, the DFR is left in the portion to be the magnetic path, and the portion to be the magnetic path is protected. The predetermined pattern is a through hole corresponding to a position where the first inductor wire 21A and the second connection wire 82 on the second insulating layer 15 and the via wire 25 on the second inductor wire 22A and the first connection wire 81 are provided. Thereafter, while power is supplied to the seed layer, the via wire 25 is formed in the via 15*a*, and the first inductor wire 21A and the second connection wire 82 are formed on the second insulating layer 15 by using an electrolytic plating method. Thereafter, the DFR 75 is peeled off, and the seed layer is etched.

Figure 9F:
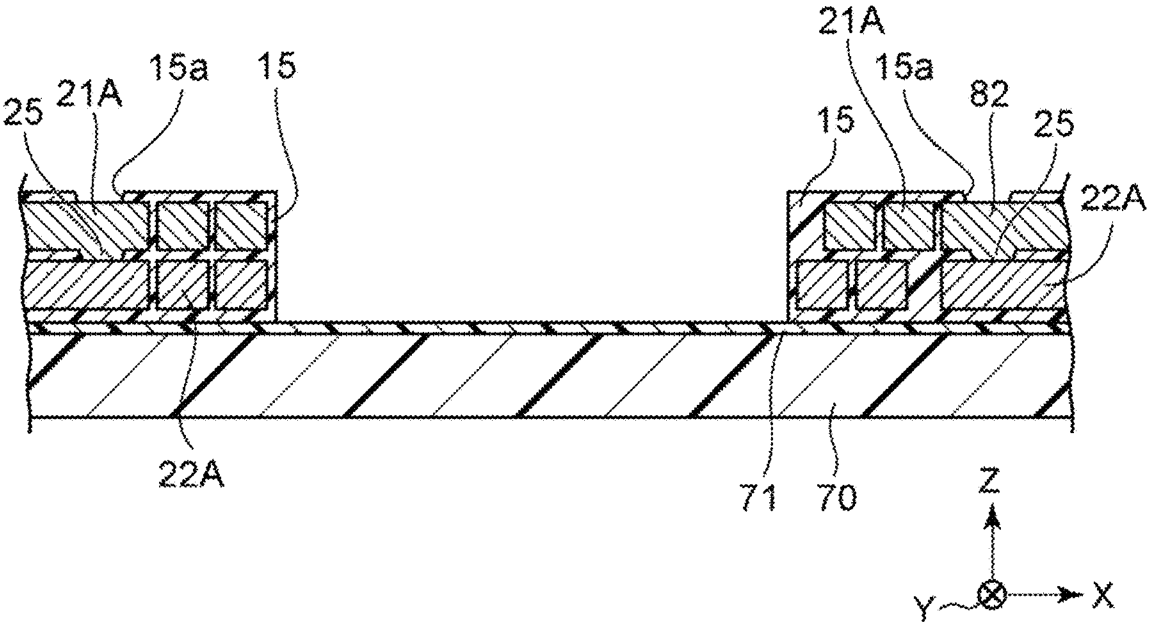
FIG. 9F is an explanatory diagram illustrating a manufacturing method of the inductor component.

As illustrated in FIG. 9F, the second insulating layer 15 is further applied so as to cover the exposed surfaces of the first inductor wire 21A and the first insulating layer 71. Then, the second insulating layer 15 is solidified by forming a via 15*a* corresponding to a position where the via wire 25 is provided and a through hole corresponding to a portion to be a magnetic path using a photolithography method. The solidified second insulating layer 15 becomes the insulating layer 15 illustrated in FIG. 7.

Figure 9G:
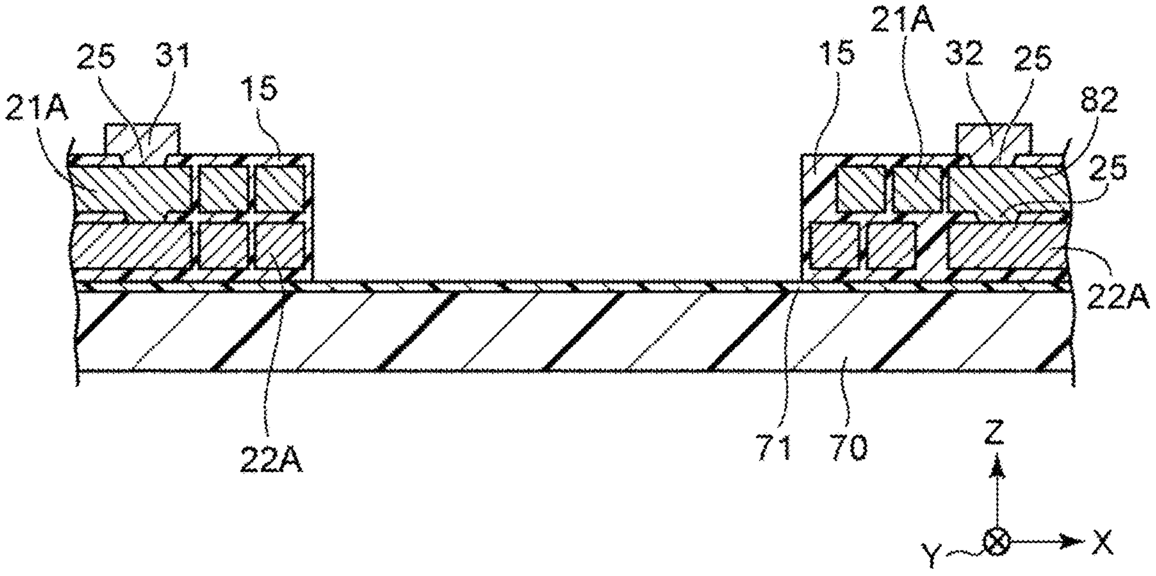
FIG. 9G is an explanatory diagram illustrating a manufacturing method of the inductor component.

As illustrated in FIG. 9G, a seed layer not illustrated in the drawings is formed on the first insulating layer 71 and the second insulating layer 15 by a known method such as a sputtering method or a vapor deposition method. Thereafter, a DFR is attached, and a predetermined pattern is formed in the DFR using a photolithography method. At this time, the DFR is left in the portion to be the magnetic path, and the portion to be the magnetic path is protected. The predetermined pattern is a through hole corresponding to a position where the via wire 25 on the first inductor wire 21A and the second connection wire 82 and the first and second columnar wires 31 and 32 are provided. Thereafter, while power is supplied to the seed layer, the via wire 25 is formed in the via 15*a*, and the first and second columnar wires 31 and 32 are formed on the via wire 25 using an electrolytic plating method. Thereafter, the DFR 75 is peeled off, and the seed layer is etched.

Figure 9H:
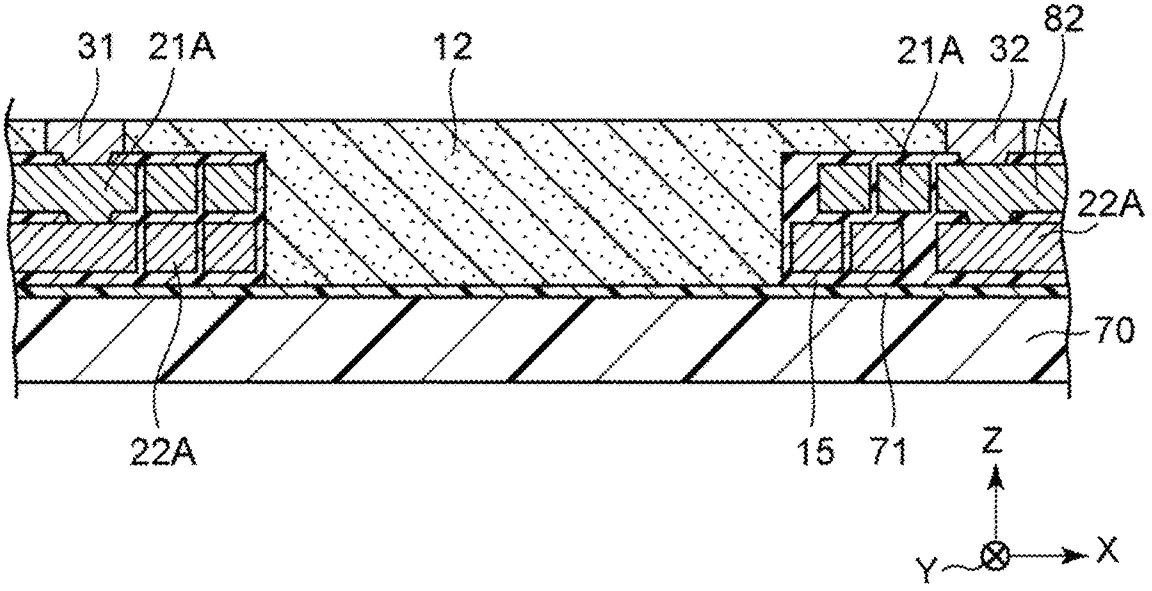
FIG. 9H is an explanatory diagram illustrating a manufacturing method of the inductor component.

As illustrated in FIG. 9H, a magnetic sheet to be the second magnetic layer 12 is pressure-bonded from above the first inductor wire 21A toward the first inductor wire 21A, and the second insulating layer 15 and the first and second columnar wires 31 and 32 are covered with the second magnetic layer 12. Thereafter, the top surface of the second magnetic layer 12 is ground, and the end faces of the first columnar wire 31 and the second columnar wire 32 are exposed from the top surface of the second magnetic layer 12.

Figure 9I:
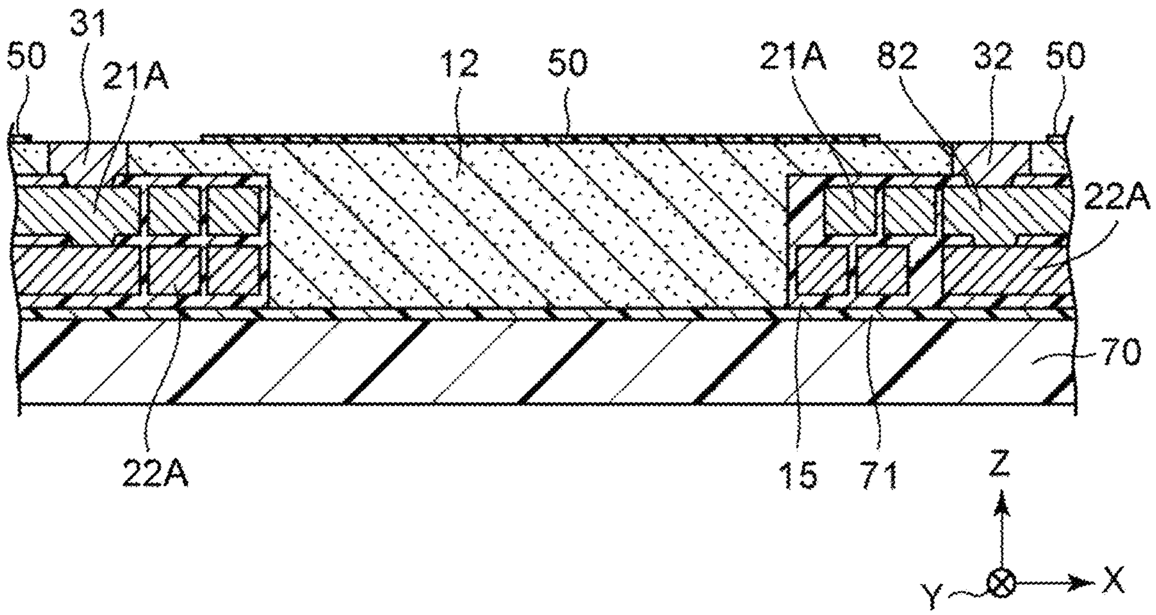
FIG. 9I is an explanatory diagram illustrating a manufacturing method of the inductor component.

As illustrated in FIG. 9I, a third insulating layer 50 is applied to the top surface of the second magnetic layer 12. Then, the third insulating layer 50 is formed in a predetermined pattern by using a photolithography method and solidified. The predetermined pattern is a pattern in which the third insulating layer can cover a region of the top surface of the second magnetic layer 12 excluding regions where the first and second external terminals 41A and 42A are formed. The solidified third insulating layer 50 becomes the coating film 50 illustrated in FIG. 7.

Figure 9J:
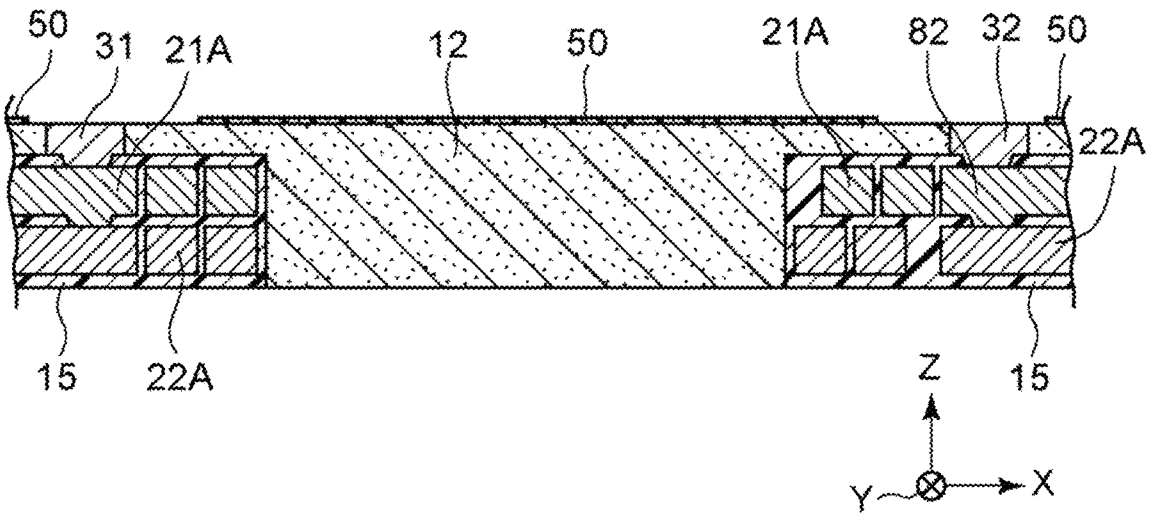
FIG. 9J is an explanatory diagram illustrating a manufacturing method of the inductor component.

As illustrated in FIG. 9J, the base substrate 70 and the first insulating layer 71 are removed by polishing. At this time, the base substrate 70 and the first insulating layer 71 may be removed by peeling with the first insulating layer 71 as a peeling layer.

Figure 9K:
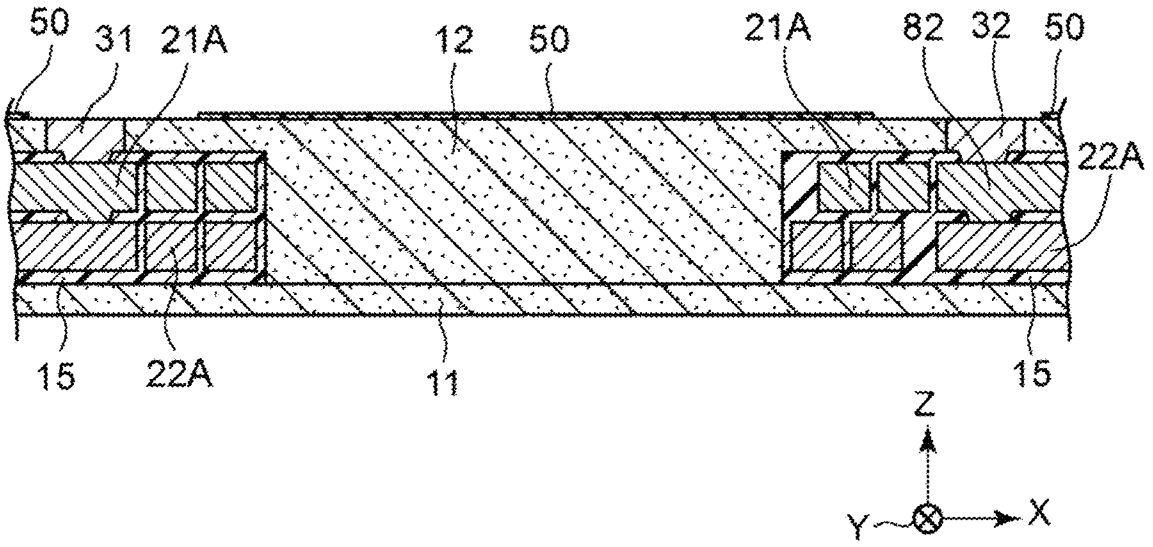
FIG. 9K is an explanatory diagram illustrating a manufacturing method of the inductor component.

As illustrated in FIG. 9K, another magnetic sheet to be the first magnetic layer 11 is pressure-bonded from below the second inductor wire 22A toward the second inductor wire 22A, and the bottom surfaces of the second insulating layer 15 and the second magnetic layer 12 are covered with the first magnetic layer 11. Thereafter, the first magnetic layer 11 is ground to a predetermined thickness.

Figure 9L:
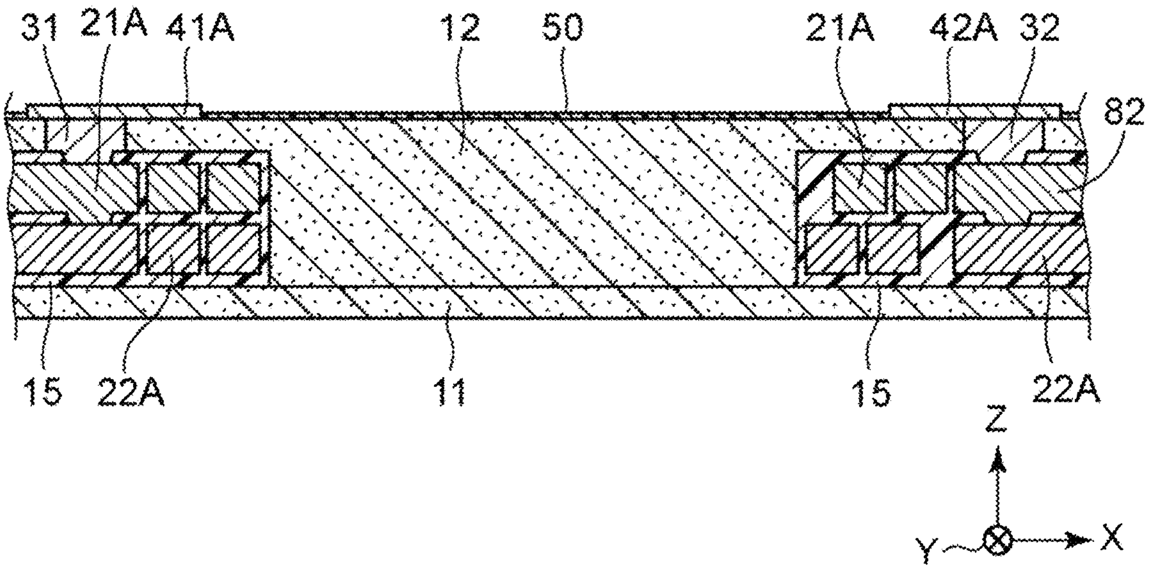
FIG. 9L is an explanatory diagram illustrating a manufacturing method of the inductor component.

As illustrated in FIG. 9L, the first and second external terminals 41A and 42A are formed by electroless plating so as to cover the end faces of the first and second columnar wires 31 and 32 exposed from the first principal surface 10*a*. The first and second external terminals 41A and 42A are, for example, Cu/Ni/Au stacked sequentially from the side of the first principal surface 10*a*. Before the first and second external terminals 41A and 42A are formed, a catalyst such as Pd not illustrated in the drawings may be applied to portions where the first and second external terminals 41A and 42A are in contact with the top surface of the element body 10 and the end faces of the first and second columnar wires 31 and 32.

Figure 9M:
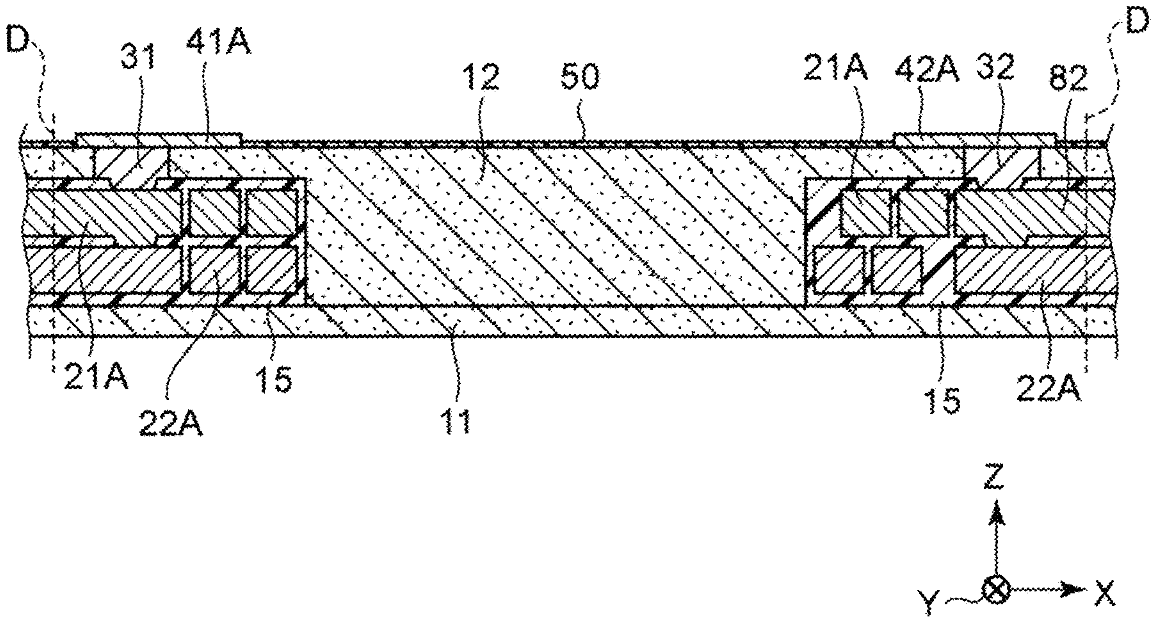
FIG. 9M is an explanatory diagram illustrating a manufacturing method of the inductor component.

As illustrated in FIG. 9M, the inductor component 1A is cut with a dicing machine along a cutting line D. At the time of cutting with the dicing machine or after cutting with the dicing machine, the oxidized region and the non-oxidized region are formed on the element body side surface, and the recess is preferably formed at the time of cutting with the dicing machine, in the same manner as in the first embodiment. In this way, the inductor component 1A is manufactured as illustrated in FIG. 7. At this time, since the top surface of the element body 10 is covered with the third insulating layer 50, no oxidized region is formed.

Third Embodiment

Figure 10:
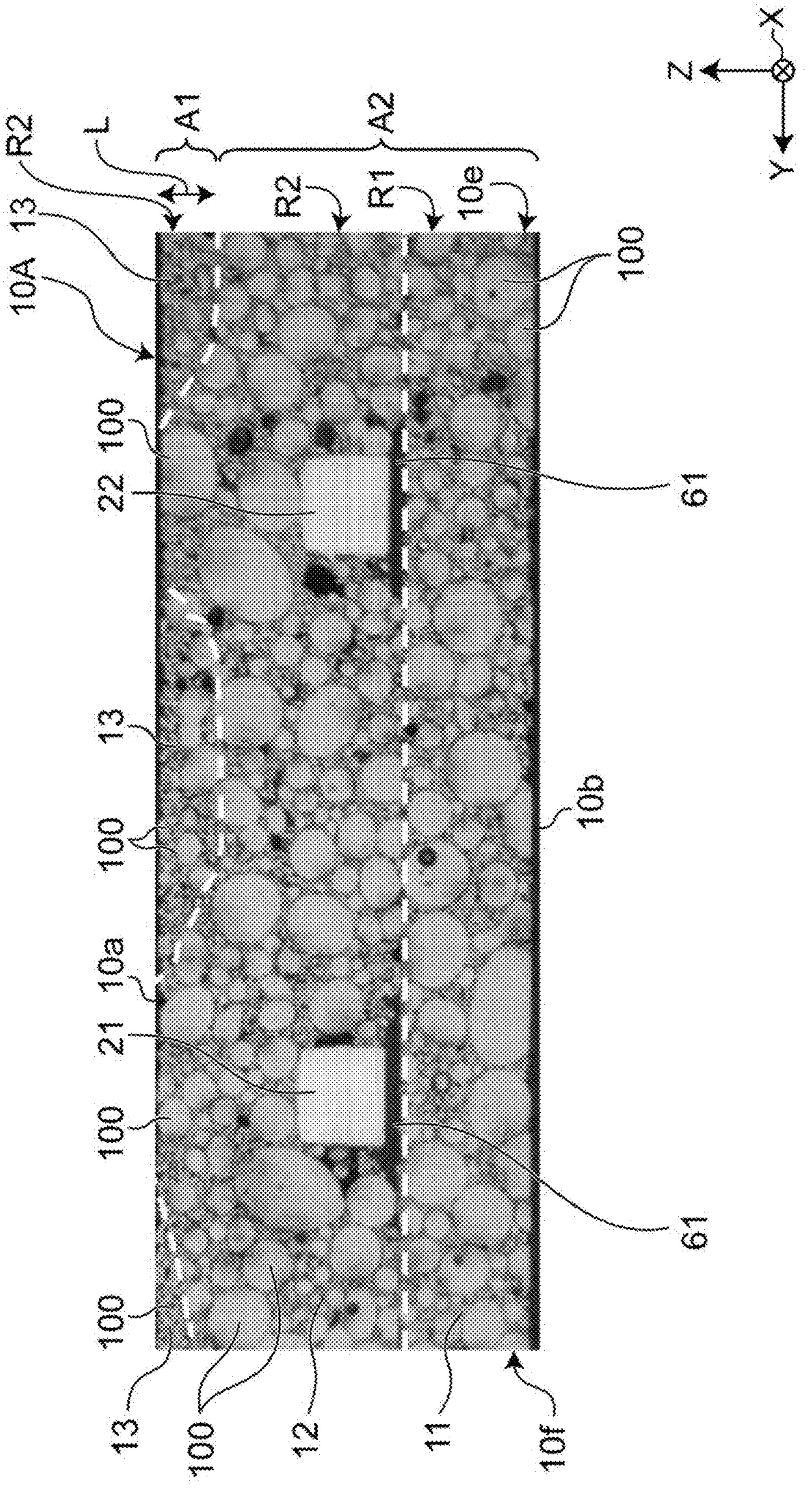
FIG. 10 is an image view illustrating a section of an element body according to a third embodiment.

FIG. 10 is an image diagram illustrating a third embodiment of the inductor component. The third embodiment is different from the first embodiment in a configuration of an element body. The different configurations will be described below. Since the other structures are the same as those of the first embodiment, the same reference numerals as those of the first embodiment are given, and the description thereof will be omitted. FIG. 10 corresponds to a section taken along the line C-C in FIG. 1.

As illustrated in FIG. 10, a third side surface 10*e* of an element body 10A has a first region A1 in a predetermined range in a direction (Z direction) orthogonal to a first principal surface 10*a* from the first principal surface 10*a*, and a second region A2 other than the first region A1, and D50 of a grain diameter of a magnetic powder 100 in the second region A2 is larger than D50 of a grain diameter of the magnetic powder 100 in the first region A1. The first region A1 has a larger area of a non-oxidized region R2 than the second region A2, and the second region A2 has a larger area of an oxidized region R1 than the first region A1. This is because the magnetic powder 100 having a large grain diameter is easily oxidized, and the oxidized region R1 can be easily formed, and as a result, the area of the oxidized region R1 of the first region A1 including the magnetic powder 100 having a large grain diameter can be increased.

The "predetermined range" is set within a range in which a length L of the first region A1 in the direction (Z direction) orthogonal to the first principal surface 10*a* is shorter than a wire length of a first columnar wire 31. The length L is preferably half or less of the wire length of the first columnar wire 31, and more preferably ⅓ or less of the wire length of the first columnar wire 31. In addition, the length L is preferably 1/10 or more of the thickness of the element body 10 from the viewpoint of securing the strength of a corner of the element body 10. The length L is, for example, 30 μm.

The "D50 of the grain diameter of the magnetic powder 100 in the first region A1" and the "D50 of the grain diameter of the magnetic powder 100 in the second region A2" can be measured by, for example, SEM observation of the third side surface 10*e*. A specific method for calculating the grain diameter by the SEM observation is similar to the method for calculating the grain diameter of the magnetic powder 100 described in the first embodiment. The other first side surface 10*c*, second side surface 10*d*, and fourth side surface 10*f* also have configurations similar to that of the third side surface 10*e*.

According to the present embodiment, D50 of the grain diameter of the magnetic powder 100 in the second region A2 is larger than D50 of the grain diameter of the magnetic powder 100 in the first region A1. As can be seen from FIG. 10, a state of the second region A2 of the third side surface 10*e* is maintained inside the element body 10 in an XY plane direction with respect to the second region A2. Therefore, the magnetic powder 100 having a relatively large grain diameter is disposed around the first and second inductor wires 21 and 22. As a result, inductance can be secured. In addition, the magnetic powder 100 having a relatively small grain diameter is disposed in the first region A1. In the magnetic powder 100 having a relatively small grain diameter, a contact area between the grains becomes small. Therefore, a short circuit through the magnetic powder 100 in the first region A1 can be suppressed. In the third side surface 10*e*, the area of the oxidized region R1 is larger in the second region A2 than in the first region A1, so that the short circuit through the magnetic powder 100 in the second region A2 can be suppressed. Note that, in the element body 10A, the inductance can be further increased by increasing the range of the second region A2, and the short circuit around the first principal surface through the magnetic powder 100 can be further suppressed by increasing the range of the first region A1.

For example, examples of the magnetic powder used for the non-oxidized region R2 include magnetic powder having D50 of a grain diameter of 2 μm or less, including a FeSiCr alloy or the like, and easily forming a passive film other than Fe systems on the surface of the magnetic powder. In the image diagram of FIG. 10, magnetic powder having D50 of a grain diameter of 1.4 μm and D90 of a grain diameter of 3.1 μm is used. On the other hand, examples of the magnetic powder used for the oxidized region R1 include magnetic powder having D50 of a grain diameter of 5 μm or more and having a high composition ratio of Fe such as an FeSi alloy. In the image diagram of FIG. 10, magnetic powder having D50 of a grain diameter of 6.8 μm and D90 of a grain diameter of 14.0 μm is used.

Preferably, the Fe element amount in the oxidized region R1 is larger than the Fe element amount in the non-oxidized region R2. Specifically, an oxide film of the oxidized region R1 is iron oxide. According to the above configuration, since the amount of Fe element in the oxidized region R1 is large, a large amount of Fe element can be disposed around the first and second inductor wires 21 and 22, and inductance can be secured.

Preferably, the element body 10A includes a first magnetic layer 11, a second magnetic layer 12, and a third magnetic layer 13 stacked in a direction orthogonal to the first principal surface 10*a*. In FIG. 10, for convenience, a boundary between the first magnetic layer 11, the second magnetic layer 12, and the third magnetic layer 13 is drawn by a dotted line. The second magnetic layer 12 mainly includes the magnetic powder 100 having a large grain diameter, and the third magnetic layer 13 mainly includes the magnetic powder 100 having a small grain diameter. The second magnetic layer 12 in contact with the first and second inductor wires 21 and 22 is disposed along a part of the outer shapes of the first and second inductor wires 21 and 22. According to the above configuration, the second magnetic layer 12 can be disposed along the periphery of the first and second inductor wires 21 and 22, and inductance can be secured.

Figure 11:
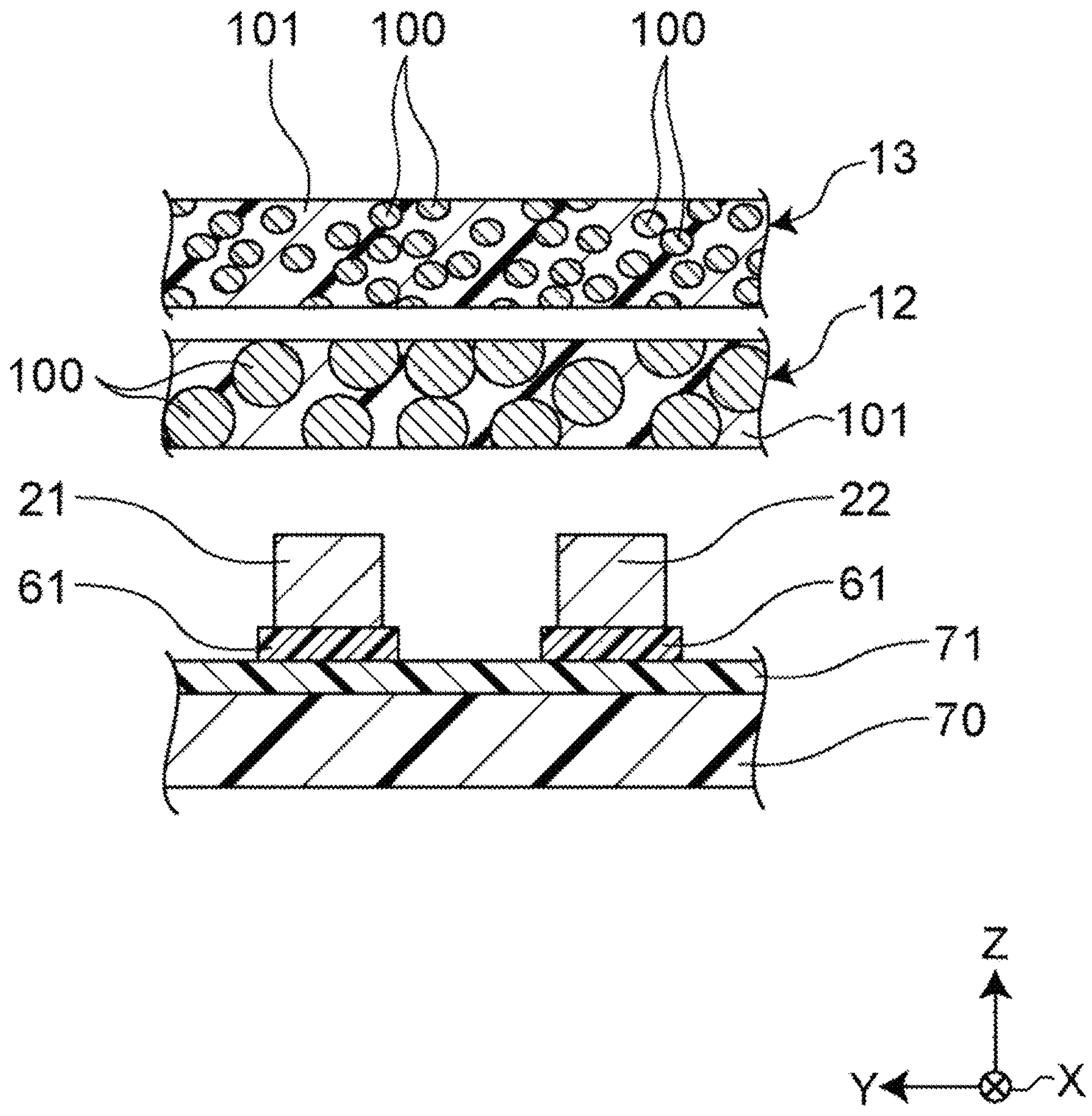
FIG. 11 is an explanatory diagram illustrating a manufacturing method of the inductor component.

A method for manufacturing the inductor component at this time will be described. The manufacturing method is similar to that in FIGS. 4A to 4F of the first embodiment. Thereafter, as illustrated in FIG. 11, a magnetic sheet mainly containing the magnetic powder 100 having a large grain diameter as the second magnetic layer 12 is pressure-bonded from above the first inductor wire 21 and the second inductor wire 22, and the first inductor wire 21 and the second inductor wire 22 are covered with the second magnetic layer 12. Then, the magnetic sheet including the magnetic powder 100 mainly having a small grain diameter as the third magnetic layer 13 is pressure-bonded from above the magnetic sheet of the second magnetic layer 12, and the second magnetic layer 12 is covered with the third magnetic layer 13. At this time, the second magnetic layer 12 and the third magnetic layer 13 are convex upward in a portion where the first inductor wire 21 and the second inductor wire 22 are present. Thereafter, parts of the second magnetic layer 12 and the third magnetic layer 13 are ground. Thereafter, the manufacturing method is similar to that in FIGS. 4H to 41 of the first embodiment.

Note that the present disclosure is not limited to the above-described embodiments, and can be changed in design without departing from the gist of the present disclosure. For example, the respective feature points of the first and third embodiments may be variously combined.

In the above embodiments, two inductor wires of the first inductor wire and the second inductor wire are disposed in the element body, but one or three or more inductor wires may be disposed, and at this time, the number of external terminals and the number of columnar wires are also four or more.

In the above embodiments, the "inductor wire" is to give the inductance to the inductor component by generating a magnetic flux in the magnetic layer when a current flows, and the structure, shape, material, and the like of the inductor wire are not particularly limited. In particular, various known wire shapes such as meander wire can be used without being limited to a straight line or a curved line (spiral=two-dimensional curved line) extending on a plane as in the embodiments. In addition, the total number of inductor wires is not limited to one layer or two layers, and a multilayer configuration of three or more layers may be used. In addition, the shape of the columnar wire is rectangular when viewed from the Z direction, but may be circular, elliptical, or oval.

The control of the oxidized region and the non-oxidized region is not limited to the methods described in the above embodiments, and other forming methods may be used. For example, the fluidity of the resin of the magnetic layer may be lowered. As a result, since the magnetic powder flows simultaneously with the resin, locking of the magnetic powder is less likely to occur. Therefore, as the pressure in the upper portion of the inductor wire increases, the magnetic powder flows to a region other than the upper portion of the inductor wire, and as a result, a filling rate of the magnetic powder on the side of the element body side surface increases, and the oxidized region can be formed on the element body side surface.

What is claimed is:

1. An inductor component comprising:

an element body that includes magnetic powder and has a first principal surface, a second principal surface, and a side surface connecting the first principal surface and the second principal surface;

an inductor wire that is in the element body;

a first vertical wire that is in the element body, is connected to a first end of the inductor wire, and extends to the first principal surface;

a second vertical wire that is in the element body, is connected to a second end of the inductor wire, and extends to the first principal surface;

a first external terminal that is connected to the first vertical wire and is exposed on the first principal surface; and a second external terminal that is connected to the second vertical wire and is exposed on the first principal surface, the magnetic powder containing an Fe element as a main component, and the side surface including an oxidized region in which an oxide film configured by oxidizing a plurality of magnetic powders is exposed, and a non-oxidized region in which the plurality of magnetic powders are exposed, wherein the oxide film is on a cut section of the magnetic powder.

2. The inductor component according to claim 1, wherein the element body includes a resin containing the magnetic powder, and the magnetic powder in the oxidized region includes magnetic powder that is in contact with the resin with the oxide film interposed therebetween.

3. The inductor component according to claim 1, wherein the element body includes a resin containing the magnetic powder, and the magnetic powder in the oxidized region includes magnetic powder that is in direct contact with the resin.

4. The inductor component according to claim 1, wherein the oxidized region has a larger ratio of a reflectance of a wavelength of from 600 nm to 800 nm to a reflectance of a wavelength of less than 600 nm than the non-oxidized region.

5. The inductor component according to claim 1, wherein a thickness of the oxide film is smaller than D50 of a grain diameter of the magnetic powder.

6. The inductor component according to claim 1, wherein the inductor wire has a first extended portion that is connected to the first end of the inductor wire and is exposed from the side surface of the element body.

7. The inductor component according to claim 1, wherein the inductor wire includes a plurality of inductor wires, and the plurality of inductor wires are disposed on the same plane parallel to the first principal surface and are electrically separated from each other.

8. The inductor component according to claim 6, wherein the inductor wire includes a plurality of inductor wires, and the plurality of inductor wires are disposed along a direction orthogonal to the first principal surface.

9. The inductor component according to claim 1, further comprising:

an insulating layer that is on the first principal surface.

10. The inductor component according to claim 1, wherein the first principal surface has the oxidized region and the non-oxidized region.

11. The inductor component according to claim 1, wherein the side surface of the element body has a first region in a predetermined range from the first principal surface in a direction orthogonal to the first principal surface, and a second region other than the first region, D50 of the grain diameter of the magnetic powder in the second region is larger than D50 of the grain diameter of the magnetic powder in the first region, and on the side surface, the first region has a larger area of the non-oxidized region than the second region, and the second region has a larger area of the oxidized region than the first region.

12. The inductor component according to claim 1, wherein the element body has a plurality of magnetic layers stacked in a direction orthogonal to the first principal surface, and the magnetic layer in contact with the inductor wire is disposed along a part of an outer shape of the inductor wire.

13. The inductor component according to claim 1, wherein

D50 of the grain diameter of the magnetic powder in the oxidized region is larger than D50 of the magnetic powder in the non-oxidized region.

14. The inductor component according to claim 13, wherein an amount of Fe element in the oxidized region is larger than an amount of Fe element in the non-oxidized region.

15. The inductor component according to claim 1, wherein the side surface further has a recess.

16. The inductor component according to claim 2, wherein the oxidized region has a larger ratio of a reflectance of a wavelength of from 600 nm to 800 nm to a reflectance of a wavelength of less than 600 nm than the non-oxidized region.

17. The inductor component according to claim 2, wherein a thickness of the oxide film is smaller than D50 of a grain diameter of the magnetic powder.

* * * * *